US012044066B2

(12) United States Patent
Kirby et al.

(10) Patent No.: US 12,044,066 B2
(45) Date of Patent: Jul. 23, 2024

(54) WINDOW TREATMENT HAVING AN ADJUSTABLE VALANCE

(71) Applicant: Lutron Technology Company LLC, Coopersburg, PA (US)

(72) Inventors: David A. Kirby, Zionsville, PA (US); Mailing Ren Wu, Lansdale, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 16/992,451

(22) Filed: Aug. 13, 2020

(65) Prior Publication Data

US 2021/0047884 A1 Feb. 18, 2021

Related U.S. Application Data

(60) Provisional application No. 62/886,071, filed on Aug. 13, 2019.

(51) Int. Cl.
*E06B 9/323* (2006.01)
*E06B 9/262* (2006.01)
(Continued)

(52) U.S. Cl.
CPC ................ *E06B 9/32* (2013.01); *E06B 9/262* (2013.01); *E06B 9/303* (2013.01); *E06B 9/322* (2013.01);
(Continued)

(58) Field of Classification Search
CPC .. E06B 9/303; E06B 9/262; E06B 2009/2627; E06B 9/32; E06B 9/322;
(Continued)

(56) References Cited

U.S. PATENT DOCUMENTS 6,382,294 B1 5/2002 Anderson et al.
6,672,359 B2 1/2004 Morris
(Continued)

FOREIGN PATENT DOCUMENTS

AU 2007200010 7/2008
EP 1020612 7/2000
(Continued)

OTHER PUBLICATIONS

International Search Report and Written Opinion of corresponding International Application No. PCT/US2020/046074, dated Nov. 16, 2020.
(Continued)

*Primary Examiner* — Daniel P Cahn
*Assistant Examiner* — Jeremy C Ramsey
(74) *Attorney, Agent, or Firm* — Duane Morris LLP

(57) ABSTRACT

A motorized window treatment system (e.g., a motorized blind system) may include a headrail, a covering material extending from the headrail, a battery compartment coupled to the headrail, a valance clip comprising a stationary portion coupled to the headrail and a movable portion configured to be coupled to the stationary portion such that the movable portion is movable from a first position to a second position, and a valance configured to be coupled to the movable portion of the valance clip. When the movable portion is in the first position, the valance may cover the battery compartment. When the movable portion is in the second position, the battery compartment may be at least partially exposed. The battery compartment may be configured to hold at least one battery for powering a drive unit of the motorized window treatment system.

18 Claims, 18 Drawing Sheets

(51) Int. Cl.
*E06B 9/303* (2006.01)
*E06B 9/32* (2006.01)
*E06B 9/322* (2006.01)

(52) U.S. Cl.
CPC ....... *E06B 2009/2627* (2013.01); *E06B 9/323* (2013.01)

(58) Field of Classification Search
CPC ........ E06B 9/323; E06B 9/42; E06B 9/17007; E06B 9/17015; E06B 9/38; E06B 9/68; A47H 2/00
See application file for complete search history.

(56) References Cited

U.S. PATENT DOCUMENTS

| | | | | |
|---|---|---|---|---|
| 7,730,923 | B2 * | 6/2010 | Zhang | E06B 9/323 160/38 |
| 8,540,005 | B2 | 9/2013 | Baugh et al. | |
| 8,723,466 | B2 | 5/2014 | Chambers et al. | |
| 8,851,141 | B2 * | 10/2014 | Blair | E06B 9/38 160/84.02 |
| 9,115,537 | B2 | 8/2015 | Blair | |
| 9,488,000 | B2 | 11/2016 | Kirby et al. | |
| 10,094,169 | B2 * | 10/2018 | Kirby | E06B 9/42 |
| 2003/0168187 | A1 | 9/2003 | Wen et al. | |
| 2003/0221794 | A1 | 12/2003 | Morris | |
| 2011/0253320 | A1 * | 10/2011 | Baugh | E06B 9/322 160/127 |
| 2012/0073765 | A1 | 3/2012 | Hontz et al. | |
| 2012/0090797 | A1 | 4/2012 | Mullet et al. | |
| 2014/0305601 | A1 | 10/2014 | Mullet et al. | |
| 2015/0013920 | A1 * | 1/2015 | Mullet | E06B 9/322 160/7 |
| 2016/0038012 | A1 * | 2/2016 | McMahon | A61B 1/0669 600/210 |
| 2018/0283093 | A1 * | 10/2018 | Tseng | E06B 9/323 |

FOREIGN PATENT DOCUMENTS

| | | | |
|---|---|---|---|
| GB | 2521887 | A | 7/2015 |
| JP | 6282055 | B2 | 2/2018 |
| TW | M549584 | U | 10/2017 |

OTHER PUBLICATIONS

Office Action issued for corresponding Chinese Patent Application No. 202080071476.8 dated Feb. 11, 2023, 10 pages.
Protest and Submission of Prior Art for Canadian Patent Application No. 3147626 dated Apr. 17, 2023, 247 pages.
Office Action issued for corresponding Canadian Patent Application No. 3, 147,626 dated Mar. 17, 2023, 7 pages.
Office Action issued for corresponding Chinese Patent Application No. 202080071476.8 dated Jan. 27, 2024, 7 pages.
Office Action issued for corresponding Canadian Patent Application No. 3,147,626 dated Feb. 22, 2024, 4 pages.

* cited by examiner

WINDOW TREATMENT HAVING AN ADJUSTABLE VALANCE

CROSS-REFERENCE TO RELATED APPLICATIONS

This application claims priority to U.S. Provisional Patent Application No. 62/886,071, filed Aug. 13, 2019, and entitled "Window Treatment Having an Adjustable Valance," the entirety of which is incorporated by reference herein.

FIELD

The present disclosure relates to a window treatments, and more particularly, to a motorized battery-powered window treatment (e.g., such as a venetian blind) having an adjustable valance.

BACKGROUND

Window treatments, such as, for example, roller shades, draperies, roman shades, and venetian blinds, are normally mounted in front of windows to provide for control of the amount of sunlight entering a space. A typical venetian blind system comprises a number of elongated slats extending along the width of the window and spaced apart vertically between a headrail and a bottom bar. The blind system typically comprises a lift cord that extends from the bottom bar through openings in the slats to the headrail and provides for lifting the bottom bar to raise and lower the slats. In a manual blind system, the end of the lift cord that is not attached to the bottom bar often hangs down from the headrail, such that a user may pull on the lift cord to raise and lower the slats. The blind system also typically comprises a tilt ladder that extends between the headrail and the bottom bar and operates to support and tilt the slats. Typical prior art manual blind systems include a rod that hangs from the headrail and may be rotated to adjust the tilt angle of the slats. The slats may be oriented substantially horizontal (i.e., perpendicular to the window) to allow sunlight to enter the space, and may be oriented substantially vertical (i.e., parallel to the window) to prevent sunlight from entering the space.

Some prior art Venetian blind systems have included a motor to provide for lifting and tilting the slats. Such motorized venetian blind systems typically comprise a single motor coupled to a drive shaft that extends across the width of the headrail. The drive shaft may have at least two drums for winding up the lift cords when the shaft is rotated by the motor. The tilt ladders are typically coupled to the drive shaft through frictional force, such that when the slats have been fully tilted in one direction, the ends of the tilt ladder slip by the drive shaft as the drive shaft is rotated. To adjust the tilt of the slats, the drive shaft may be rotated in the reverse direction, such that the frictional force between the tilt ladder and the drive shaft causes the ends of the tilt ladder to rotate.

SUMMARY

As described herein, a motorized window treatment system (e.g., a motorized blind system) may comprise: a headrail; a covering material extending from the headrail; a battery compartment coupled to the headrail; a valance clip comprising a stationary portion coupled to the headrail and a movable portion configured to be coupled to the stationary portion such that the movable portion is movable from a first position to a second position; and a valance configured to be coupled to the movable portion of the valance clip. When the movable portion is in the first position, the valance may cover the battery compartment, and when the movable portion is in the second position, the battery compartment may be at least partially exposed. In addition, the motorized window treatment system may comprise a drive unit located in the headrail adjusting the covering material to control an amount of daylight entering a space (e.g., in which the motorized window treatment system is installed). The battery compartment may be configured to hold at least one battery for powering the drive unit.

For example, the motorized window treatment system may further comprise a bottom bar, and the covering material may comprise a plurality of rectangular slats spaced apart vertically between the headrail and the bottom bar. The motorized window treatment system may comprise a tilt ladder extending from the headrail to the bottom bar and operable to support the slats and to tilt the slats. The drive unit may be operably coupled to the tilt ladder for tilting the slats. The motorized window treatment system may comprise a lift cord extending from the headrail to the bottom bar to provide for raising and lowering the bottom bar. The drive unit may be operably coupled to the lift cord for winding and unwinding the lift cord to respectively raise and lower the bottom bar.

In addition, a valance clip for coupling a valance to a headrail of a window treatment system is disclosed herein. The valance clip may comprise a stationary portion configured to couple to the headrail, and a movable portion configured to couple valance and to the stationary portion such that the valance is movable from a first position to a second position. Further, the stationary portion may comprise a first leg coupled to the headrail and a second leg configured to be coupled to the movable portion.

A method for installing, removing, or replacing batteries of a window treatment system (e.g., such as a blind system) may comprise: (1) providing a blind system comprising a headrail, a valance clip having a stationary portion coupled to the headrail and a movable portion engaged with the stationary portion, and a valance coupled to the movable portion; (2) moving the valance and the movable portion of the valance clip with respect to the headrail and the stationary portion from a first position to a second position, wherein in the first position, the valance covers a battery compartment and, when in the second position, the battery compartment is at least partially exposed; (3) removing a first battery from the battery compartment; (4) inserting a second battery into the battery compartment; and (5) moving the valance and the movable portion of the valance clip from the second position to the first position.

A method of installing a window treatment system (e.g., such as a blind system) may comprise: (1) mounting a headrail of a window treatment system to structure (e.g., a window frame and/or a wall); (2) coupling a movable portion to a valance; and (3) engaging the movable portion with a stationary portion coupled to the headrail.

BRIEF DESCRIPTION OF THE DRAWINGS

The features described herein will be more fully disclosed in the following detailed description, which is to be considered together with the accompanying drawings wherein like numbers refer to like parts and further wherein.

DETAILED DESCRIPTION

Figure 1:
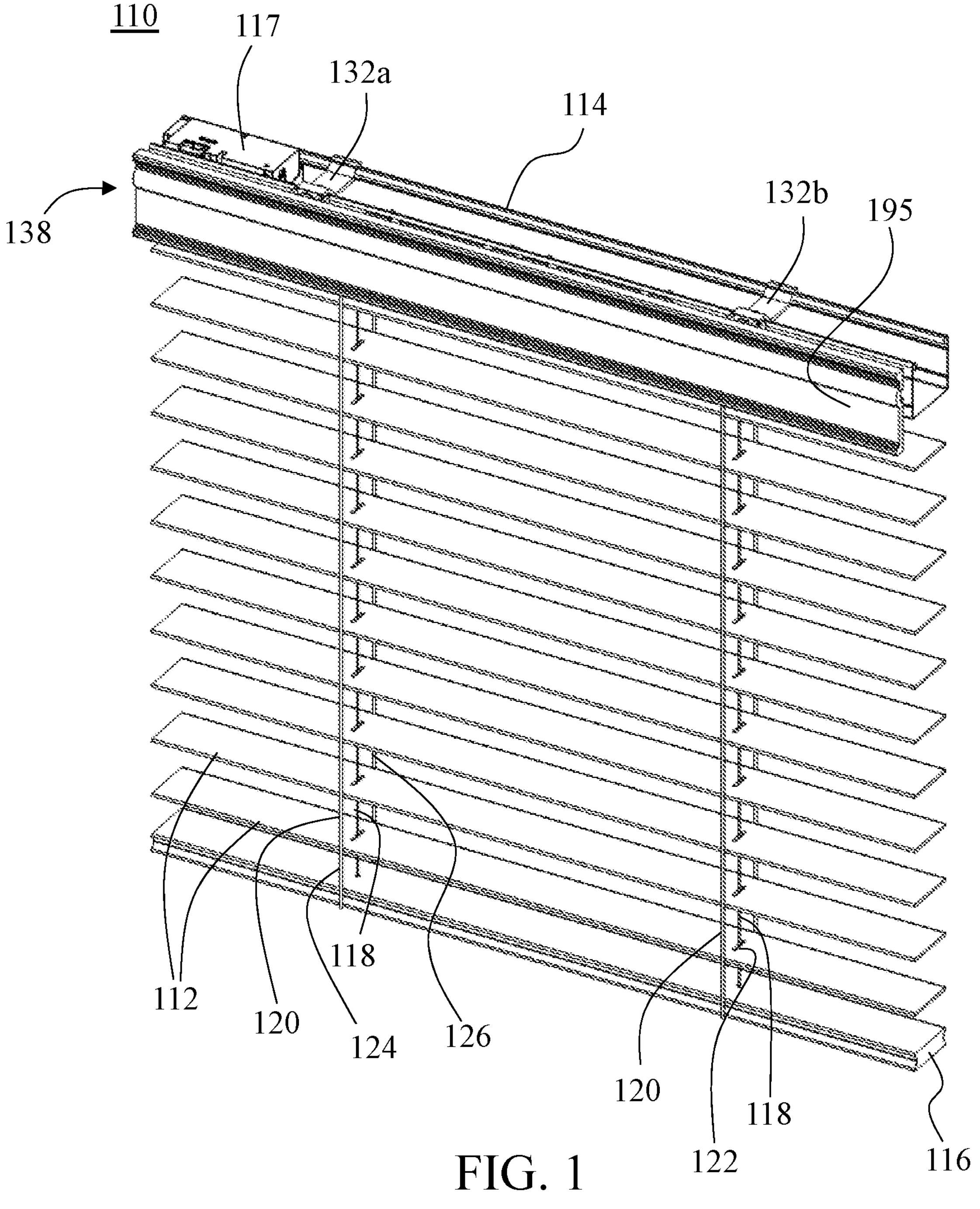
FIG. 1 shows a perspective view of a blind system, according to one embodiment described herein, in a fully lowered configuration.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

In one aspect, the blind systems described herein allow for the simple and easy replacement of batteries without the removal of the blind system from the window. The decorative valance of the blind systems are easily movable from a first position in which they cover the batteries to a second position in which the batteries are accessible. This significantly simplifies maintenance of such motorized blind systems for end users. In another aspect, the blind systems described herein are configured to accommodate larger diameter batteries than prior art systems. These larger diameter batteries may have longer effective lives than batteries that are typically used in such systems and may also have the capability of powering larger drive mechanisms.

Figure 2A:
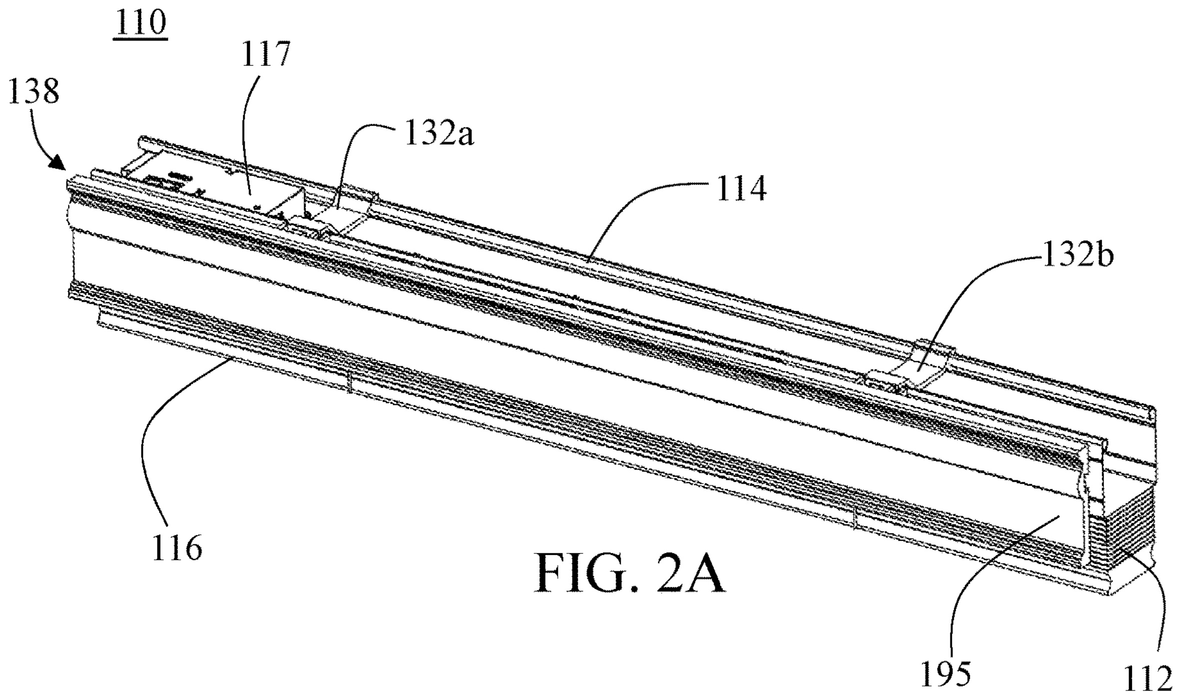
FIG. 2A shows a perspective view of the blind system of FIG. 1 in a raised configuration and with the valance in a first position.
Figure 2B:
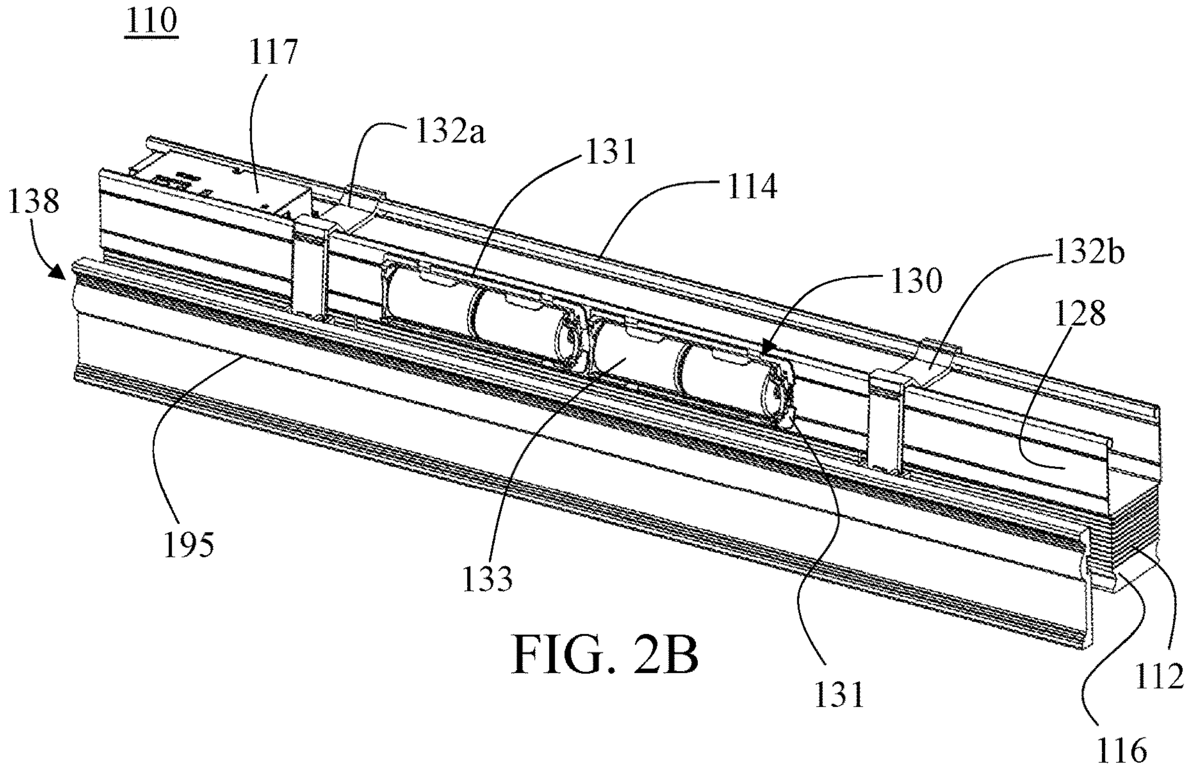
FIG. 2B shows a perspective view of the blind system of FIG. 1 in a raised configuration and with the valance moved to a second position.

FIG. 1 shows one embodiment of a motorized window treatment system, e.g., a Venetian blind system 110, in a lowered configuration (e.g., in a fully-lowered position), and FIGS. 2A and 2B show the blind system 110 in a raised configuration (e.g., in a fully-raised position). The blind system 110 may include a covering material, e.g., a plurality of flat slats 112, disposed between a headrail 114 and a bottom bar 116 (e.g., a bottom rail). The blind system 110 may be configured to be mounted in front of a window. The blind system 110 may include mounting brackets (not shown) coupled to the top of the headrail 114 for mounting the blind system 110 to a ceiling above the window, and side panels (not shown) that may allow for alternatively mounting the blind system 110 to walls surrounding the window. In addition, the covering material may comprise a cellular shade fabric, for example, as described in greater detail in commonly-assigned U.S. Pat. No. 8,950,461, which is incorporated herein by reference in its entirety.

The blind system 110 may also comprise a drive unit 117 (e.g., a blind drive unit) located in the headrail 114 for adjusting the covering material of the blind system 110 to control the amount of daylight entering a space. For example, the drive unit 117 may comprise a motor (not shown) configured to raise and lower the bottom bar 116 and/or tilting the slats 112 to control the amount of daylight entering the space as will be described in greater detail below. In one embodiment, the drive unit 117 may be configured to independently control a position of the bottom bar 116 and a tilt angle of the slats 112, so as to control the amount of daylight entering the space in which the blind system 110 is installed. In other embodiments, the drive unit 117 may be configured to only control one or the other of the position of the bottom bar 116 or the tilt angle of the slats 112. For example, in various embodiments, the drive unit 117 may be configured to only control the tilt angle of the slats 112. In such embodiments, the position of the bottom bar 116 may be adjustable manually by a user. The drive unit 117 may be configured to receive a supply voltage, e.g., a direct-current (DC) supply voltage from a DC power supply, such as, for example, a battery (e.g., an alkaline battery, a nickel cadmium battery, a nickel metal hydride battery, a lithium ion battery, etc.). The drive unit 117 may include a wireless communication circuit, e.g., such as a radio-frequency (RF) receiver or transceiver, for receiving wireless signals (e.g., RF signals). The drive unit 117 may be configured to raise and lower the bottom bar 116 and/or tilt the slats 112 to control the amount of daylight entering a space in response to a command received via the wireless signals.

The blind system 110 may comprise two lift cords 118 positioned at the left and right ends of the slats 112 to provide for lifting the bottom bar 116. The blind system 110 may further comprise two tilt ladders 120 positioned at the left and right ends of the slats 112 to provide for tilting the slats 112. The slats 112 may extend across the width of the window that the blind system 110 (e.g., such that the blind system 110 may be capable of covering the window) and the slats 112 may be spaced apart equally between the headrail 114 and the bottom bar 116. Alternatively, the slats 112 may comprise curved slats rather than flat slats. The lift cords 118 may each extend from the headrail 114 to the bottom bar 116 through respective lift cord openings 122 in each of the slats 112. In embodiments that include motorized raising and lowering of the bottom bar 116, the drive unit 117 may be configured to wind and unwind the lift cords 118 to respectively raise and lower the bottom bar 116 between a fully-raised position $P_{FR}$ (e.g., as shown in FIGS. 2A and 2B) and a fully-lowered position $P_{FL}$ (e.g., as shown in FIG. 1). In such embodiments, as the drive unit 117 raises the bottom bar 116, the slats 112 may each contact the bottom bar one-by-one and may be raised up with the bottom bar. In addition, the drive unit 117 may control the bottom bar 116 to a specific intermediate position between the fully-raised position and the fully-lowered position.

The tilt ladders 120 may each have a front band 124 (e.g., a front ribbon) and a rear band 126 (e.g., a rear ribbon) that extend parallel to each other from the headrail 114 to the bottom bar 116 adjacent to the lift cords 118. The front band 124 of the tilt ladders 120 may typically be positioned in front of the lift cords 118. Each tilt ladder 120 may also comprise a plurality of rungs (not shown) (e.g., bands or ribbons) that extend from the front band 124 to the rear band 126 between each pair of adjacent slats 112 of the blind system 110 to thus form a ladder. Accordingly, each of the slats 112 may rest on one of the rungs in each of the tilt ladders 120, such that the slats may be equally spaced apart vertically when the bottom bar 116 is in the fully-lowered position $P_{FL}$. In embodiments in which the position of the bottom bar 116 is controlled by the drive unit 117, the front and rear bands 124, 126 may be coupled to the drive unit 117 in the headrail 114. As the drive unit 117 winds up the lift cord 118 to raise the bottom bar 116, the portions of the tilt ladders 120 between adjacent rungs may become slack as the raising bottom bar and accumulating slats 112 meet the next slat.

In some embodiments, the blind drive unit 117 may be configured to tilt the slats 112 by vertically moving the front and rear bands 124, 126 with respect to each other, such that the rungs, and thus the slats 112, are tilted at an angle with respect to the front and rear bands (e.g., a tilt angle ° BLIND). In such embodiments, the drive unit 117 may be configured to control the slats 112 to each be in a horizontal orientation to allow daylight to enter the space in which the blind system 110 is installed when the bottom bar 116 is at the fully-lowered position $P_{FL}$ or any intermediate positions between the fully-raised position $P_{FR}$ and the fully-lowered position $P_{FL}$. The drive unit 117 may be configured to tilt the slats 112 approximately 90 degrees in each direction from the horizontal orientation, e.g., towards the front and towards the rear of the blind system 110, to control the slats 122 to a fully front-tilted position or to a fully rear-tilted position, respectively, to thus limit the amount of daylight entering the space. Alternatively, the front and rear bands 124, 126 and the rungs of the tilt ladders 120 could comprise cords. In addition, the motorized venetian blind system 110 could comprise additional lift cords 118 and tilt ladders 120 to accommodate longer slats 112 and bottom bars 116.

The drive unit 117 can include any appropriate components and, as mentioned above, can be configured to control the position of the bottom bar 116, the tilt angle of the slats 112, or both. For example, the drive unit 117 can be configured as described in U.S. Pat. Nos. 8,851,141; 9,115,537; and 9,488,000 and U.S. Patent Application Publication No. 2012/0073765, which are incorporated herein by reference in their entireties.

Figure 3:
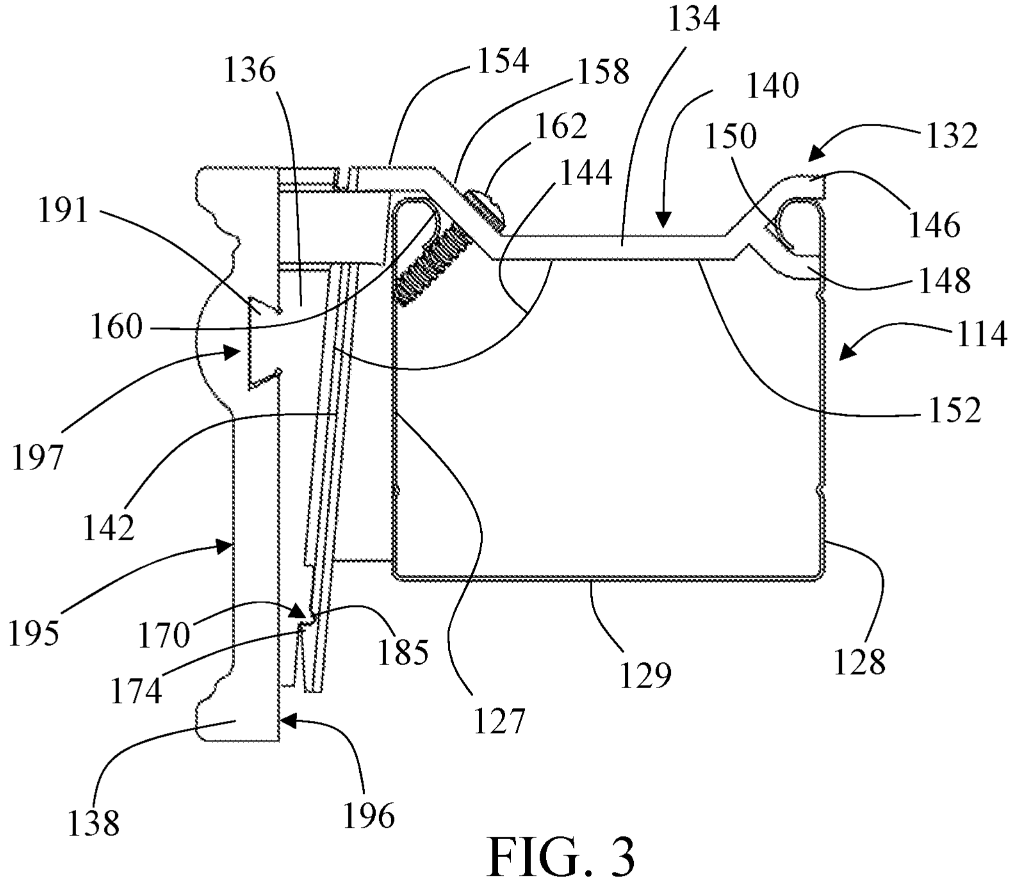
FIG. 3 shows an end view of a headrail, valance, and valance clip of the blind system of FIG. 1, with the valance in the first position.

As shown, for example, in FIG. 3, in various embodiments, the headrail 114 may include a front upright 127, a rear upright 128, and a base 129 extending between the front upright 127 and the rear upright 128. As shown in FIG. 2B, the front upright 127 may include an aperture 130 for receiving a battery compartment 131. The battery compartment 131 may be coupled to the headrail 114 using any appropriate method. For example, the battery compartment 131 may be coupled to the headrail 114 using screws, clips, adhesive, or any other means. The battery compartment 131 may include electrical connections to electrically couple batteries 133 disposed in the battery compartment 131 to the drive unit 117. Because the headrail 114 includes the aperture 130, when installed in the battery compartment 131, the batteries 133 may extend through the aperture 130 such that a portion of the battery is on each side of the front upright 127. As a result, the blind system 110 may accommodate larger batteries than prior art systems. In some embodiments, the batteries 133 may be positioned such that the batteries are centrally located with respect to the front upright 127. In other embodiments, the batteries 133 may be positioned such that the batteries are off-center with respect to the front upright 127. For example, a larger portion of the batteries 133 may be between the front upright 127 and the rear upright 128 than the portion that is in front of the front upright 127.

In some embodiments, the blind system 110 may be configured to accommodate D-cell batteries, whereas prior art systems typically used, and could only accommodate, AA batteries. The larger D-cell batteries may provide a longer effective life than the smaller AA batteries. In addition, the D-cell batteries may be capable of powering larger drive components, such as motors.

As shown in FIGS. 1-2B, the blind system 110 may include one or more valance clips 132 coupled to the headrail 114. For example, the blind system 110 may include two valance clips 132*a*, 132*b* spaced along the headrail 114. Turning to FIG. 3, each valance clip 132 may comprise a stationary portion 134 and a movable portion 136. The moving portion 134 of each valance clip 132 may be engaged with the movable portion 134. The blind system 110 may include a valance 138 coupled to the movable portions 136 of the valance clips 132. As will be described in more detail herein, the valance clips 132 may allow the valance 138 to be moved from a first position (e.g., as shown in FIG. 2A) to a second position (e.g., as shown in FIG. 2B). In the first position, the valance 138 may at least partially cover the headrail 114, and specifically, the battery compartment 131 to hide the battery compartment 131 from view. In the second position, the battery compartment 131 may be at least partially exposed to allow a user to access, remove and replace the batteries 133 held in the battery compartment 131.

As shown in FIG. 3, the stationary portion 134 may include a first leg 140 and a second leg 142. An angle 144 (shown in FIG. 3) may be defined between the first leg 140 and a surface 139 (e.g., shown in FIG. 4A) of the second leg 142. The angle 144 may be any appropriate angle. For example, in one embodiment, the angle 144 may be greater than 90 degrees such that, when the stationary portion 134 is coupled to the headrail 114, the surface 139 of the second leg 142 may extend away from the headrail 114 at an oblique angle (e.g., the surface 139 may not be parallel to the front upright 127 when viewed from the end of the headrail 114). Because the surface 139 may not be parallel to the front upright 127, the valance 138 may move away from the window and/or wall to which the blind system 110 is mounted as the movable portion 136 and the valance 138 are moved to the second position. This may provide significant advantages in applications in which the blind system 110 is installed in front of a window and the valance 138 includes returns extending back to cover the ends of the headrail 114. Moving the valance 138 away from the wall may ensure that the valance 138 does not scrape against the wall as the valance 138 is moved between the first and second positions.

The first leg 140 of the stationary portion 134 may be configured to couple to the headrail 114. For example, in one embodiment, the first leg 140 may include a first prong 146 and a second prong 148. The first 146 and second 148 prongs may define a cavity between them. The cavity may be configured to receive an inwardly curved portion 150 at the top of the rear upright 128 of the headrail 114. When the stationary portion 134 is assembled to the headrail 114, the cavity may receive the inwardly curved portion 150 to secure the stationary portion 134 to the headrail 114.

Figure 4A:
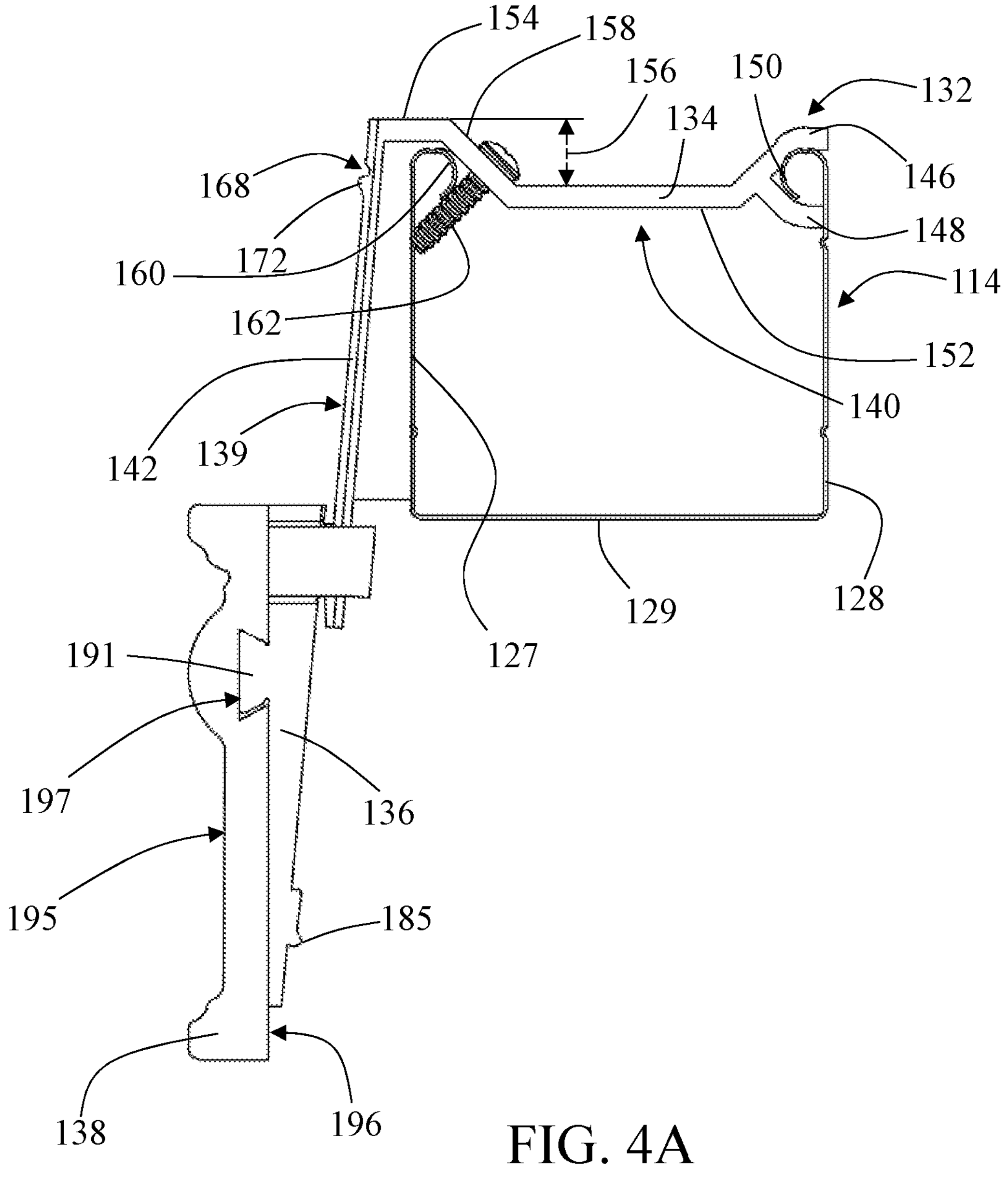
FIG. 4A shows an end view of the headrail, valance, and valance clip of the blind system of FIG. 1, with the valance in the second position.

Further, in some embodiments, the first leg 140 may include a first portion 152 from which the prongs 146, 148 extend and a second portion 154. The second portion 154 may be vertically offset from the first portion 152 by a distance 156 (e.g., as shown in FIG. 4A). The first 152 and second 154 portions may be connected by an angled portion 158. When the stationary portion 134 is assembled to the headrail 114, an inwardly curved portion 160 at the top of the front upright 127 of the headrail 114 may contact the second portion 154 and/or the angled portion 158. This contact, in conjunction with the engagement of the first and second prongs 146, 148 with the inwardly curved portion 150, may retain the stationary portion 134 in position on the headrail 114.

In addition, in some embodiments, the stationary portion 134 (e.g., the angled portion 158) may further include an aperture configured to receive a fastener 162 (e.g., a screw). For example, the fastener 162 may be inserted through an aperture in the angled portion 158 such that the fastener 162 passes under the inwardly curved portion 160. In this way, the stationary portion 134 may be locked in place with respect to the headrail 114.

The second leg 142 of the stationary portion 134 may include a first notch 168 (e.g., as shown in FIG. 4A) and a second notch 170 (e.g., as shown in FIG. 3). As will be described in more detail herein, the notches 168, 170 may be configured to retain the movable portion 136 in either the first position or the second position. The first leg 140 may further include a first curb 172 (e.g., as shown in FIG. 4A) adjacent to and below the first notch 168 and a second curb 174 (e.g., as shown in FIG. 3) adjacent to and below the second notch 170. The curbs 172, 174 may be configured to maintain the engagement of the movable portion 136 with the stationary portion 134. In some embodiments, the second curb 174 may be larger than the first curb 172. This may prevent the inadvertent removal of the movable portion 136 from the stationary portion 134.

Figure 4B:
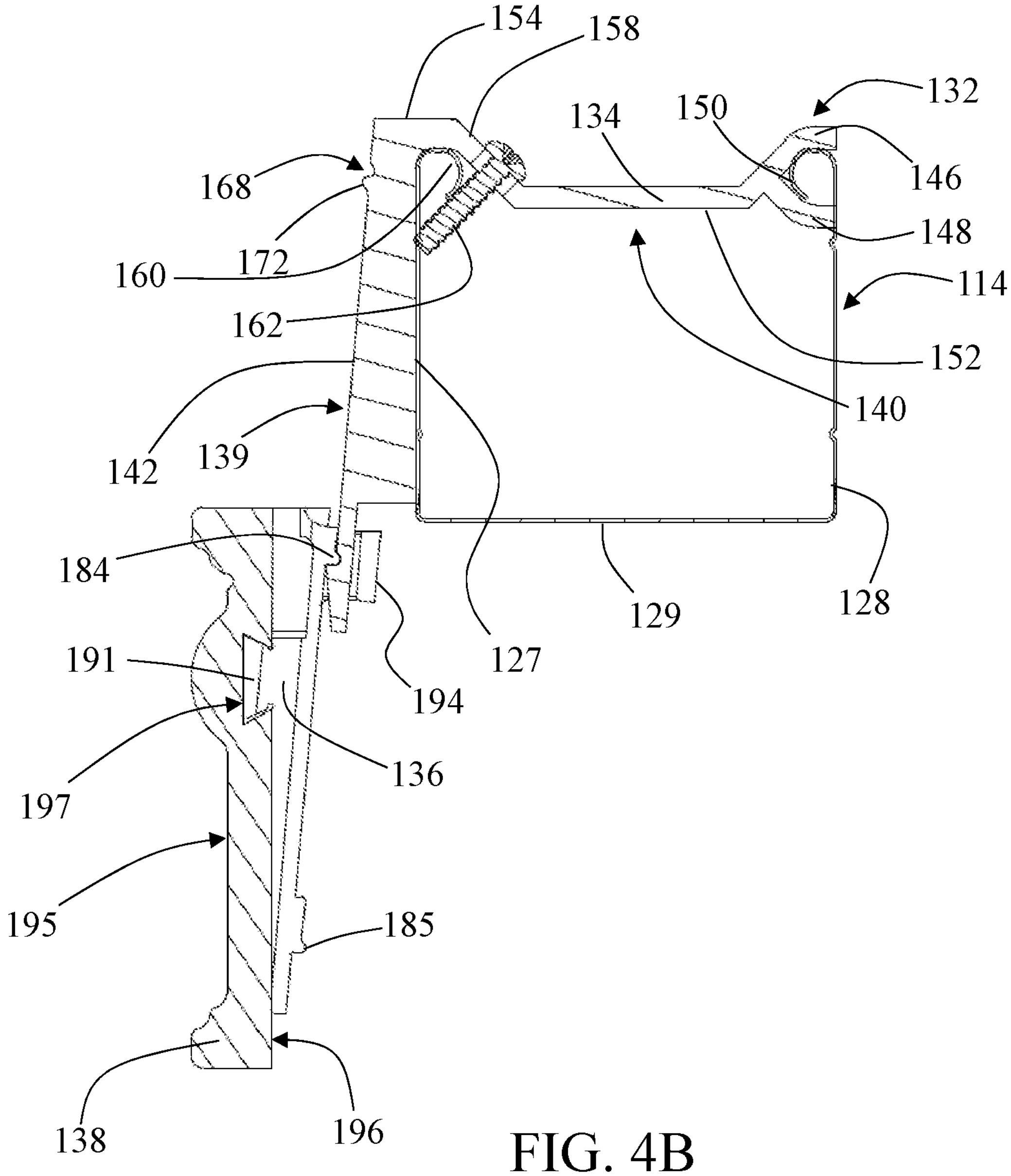
FIG. 4B shows a cross-sectional view of the headrail, valance, and valance clip of the blind system of FIG. 1, with the valance in the second position.
Figure 5:
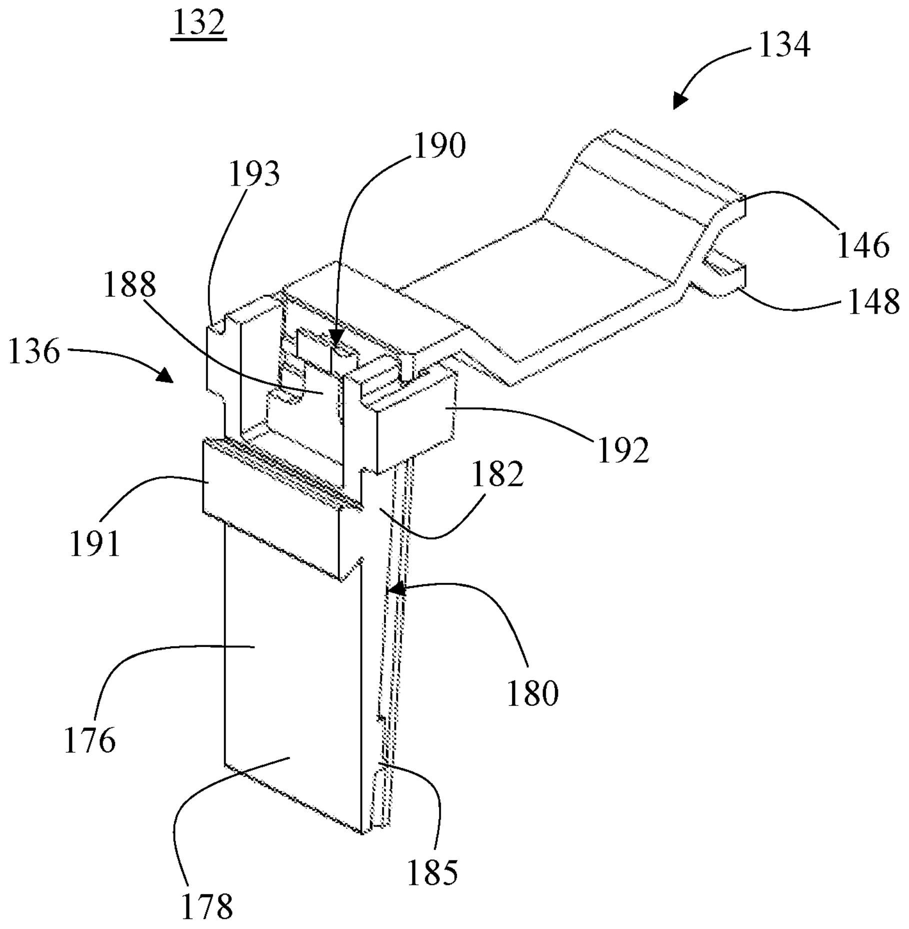
FIG. 5 shows a perspective view of the valance clip of the blind system of FIG. 1, with the valance clip in the first position.
Figure 6:
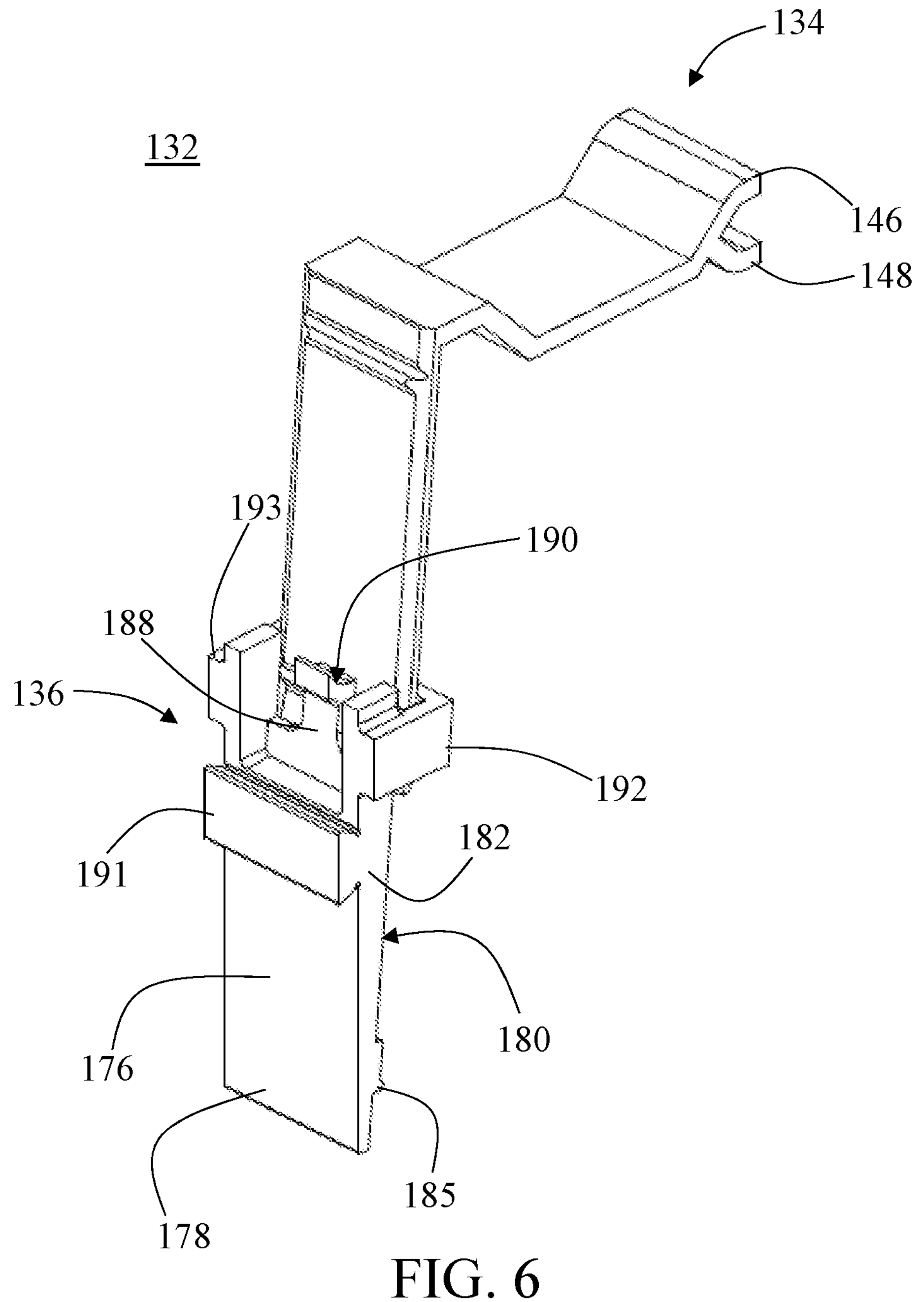
FIG. 6 shows a perspective view of the valance clip of the blind system of FIG. 1, with the valance clip in the second position.

As shown best in FIG. 5, the movable portion 136 may include a body 176 having a first surface 178, a second surface 180, and sides 182 extending between the first surface 178 and the second surface 180. The first surface 178 and the second surface 180 may be oriented at an oblique angle such that the valance 138 may be oriented horizontally when mounted to the movable portion 136. A first tooth 184 may extend from the second surface 180. When in the first position (e.g., as shown in FIGS. 3 and 5), the first tooth 184 may engage the first notch 168. When in the second position (e.g., as shown in FIGS. 4A, 4B, and 6), the first tooth 184 may engage the second notch 170. In various embodiments, the movable portion 136 may further include a second tooth 185 spaced apart from the first tooth 184. In such embodiments, the second tooth 185 may engage the second notch 170 when the movable portion 136 is in the first position, as shown, for example, in FIG. 3. This may provide more secure engagement of the movable portion 136 with the stationary portion 134.

In some embodiments, as shown in FIG. 5, the movable portion 136 may include a rocker 188, and the first tooth 184 may be a portion of the rocker 188. The rocker 188 may be pivotably coupled to the body 176 of the movable portion 136 and biased toward the second surface 180. For example, the rocker 188 may be coupled to the body 176 by a living hinge. In other embodiments, the rocker 188 may be coupled to the movable portion 136 by one or more pins (not shown) and a biasing member such as a spring. In some embodiments, the rocker 188 may include a contoured end 190 that may allow a user to comfortably engage the rocker 188 with the user's finger. The user may pivot the rocker 188 away from the second surface 180 to disengage the first tooth 184 from the first notch 168 to allow the movable portion 136 and valance 138 to be adjusted from the first position (shown in FIG. 3) to the second position (shown in FIGS. 4A and 4B). Additionally, or alternatively, pivoting the rocker 188 away from the second surface 180 may allow a user to disengage the first tooth 184 from the second notch 170 to allow for removal of the movable portion 136 and valance 138 from the stationary portion 134. This may allow the user to remove the valance 138 for cleaning, for example.

While in the illustrated embodiment the stationary portion 134 includes notches 168, 170 and the movable portion 136 includes teeth 184, 185 configured to engage the notches 168, 170, in other embodiments this arrangement may be reversed (e.g., the stationary portion 134 may include teeth and the movable portion 136 may include notches). In addition, in various embodiments, other forms of engagement (e.g., detents) may be used.

As shown, for example, in FIG. 5, the movable portion 136 may further include a male dovetail pin 191 extending from the first surface 178. As will be described in more detail herein, the pin 191 may be configured to engage a female tail in the valance 138 to couple the movable portion 136 and valance 138. While the illustrated embodiment of the movable portion 136 includes a male pin 191, in other embodiments (not shown), the movable portion 136 may include a female tail configured to receive a male pin of the valance 138.

In various embodiments, as shown in FIG. 5, the movable portion 136 may further include a first arm 192 and a second arm 193 extending away from the body 176 and toward the headrail 114. The first and second arms 192, 193 may each include an inwardly extending protrusion 194 (shown in FIG. 4B). The arms 192, 193 and protrusions 194 may be configured to engage a back face of the stationary portion 134 to maintain the engagement of the movable portion 136 with the stationary portion 134.

As shown in FIG. 3, the valance 138 may include a decorative front face 195 and an opposing rear face 196. The valance 138 may further include a female tail 197 configured to receive the pin 191 of the movable portion 136. As noted above, in other embodiments (not shown), the valance 138 may include a pin configured to engage a female tale of the movable portion 136.

FIG. 3 shows the valance clip 132 and the valance 138 assembled to the headrail 114. The inwardly curving portion 150 of the rear upright 128 of the headrail 114 may be disposed in the cavity between the first and second prongs 146, 148 of the stationary portion 134. The inwardly curving portion 160 of the front upright 127 of the headrail 114 may be in contact with the angled portion 158 of the stationary portion 134. The fastener 162 may be engaged with the inwardly curved portion 160. The second leg 142 of the stationary portion 134 may extend downward toward the bottom bar 116.

The movable portion 136 may be coupled to the stationary portion 134 with the first tooth 184 of the movable portion 136 engaged with the first notch 168. The protrusions 194 of the first and second arms 192, 193 may engage the rear face of the second leg 142 of the stationary portion 134 to maintain the engagement of the movable portion 136 and stationary portion 134.

The valance 138 may be coupled to the movable portion 136. The pin 191 of the movable portion 136 may be disposed in the tail 197 of the valance 138. As shown in the transition from FIG. 3 to FIG. 4A, the movable portion 136 and valance 138 may be movable from a first position (shown in FIG. 3) to a second position (shown in FIG. 4A). In the first position, the valance 138 may cover the battery compartment 131 such that the battery compartment 131 and the batteries 133 are not seen from within the room in which the blind system 110 is installed. In the second position, the battery compartment 131 may be at least partially exposed to allow a user to remove and replace the batteries in the battery compartment 131. The vertical distance between the valance 138 in the first position and the second position may be any appropriate distance to allow access to the battery compartment 131. For example, in one embodiment, the distance between the valance 138 in the first position and the second position may be about 1.9 inches.

In some embodiments, the valance clips 132 and the valance 138 may be shipped as an assembled unit. In other embodiments, the blind system 110 may be provided as a kit and assembled by a consumer or technician at the time of installation of the blind system 110. While the movable portion 136 of the valance clip 132 and the valance 138 are described as being separate components that are joined together (e.g., via a dovetail connection), in other embodiments, the movable portions 136 may be integrated aspects of the valance 138 and the valance 138 and the movable portions 136 may be manufactured in one piece.

Another embodiment of a blind system is shown in FIGS. 7-12. This embodiment is similar in many aspects to the embodiment shown in FIGS. 1-6. The first digit of the reference numerals for like components is incremented by one (e.g., from 110 to 210). Unless otherwise specified herein or shown in the drawings, such components may be substantially similar to those described above.

Figure 7:
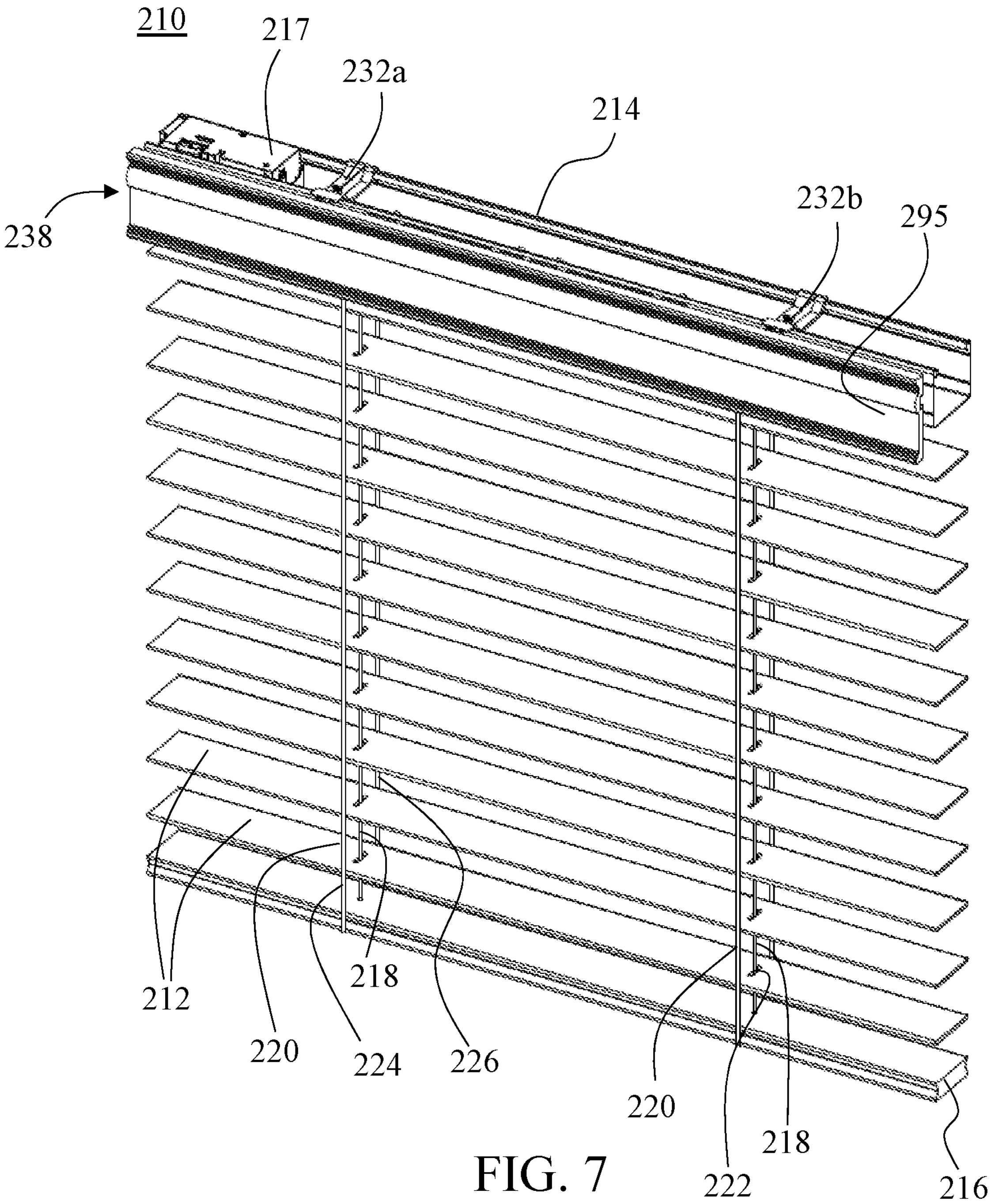
FIG. 7 shows a perspective view of a blind system, according to another embodiment described herein, in a fully lowered configuration.
Figure 8A:
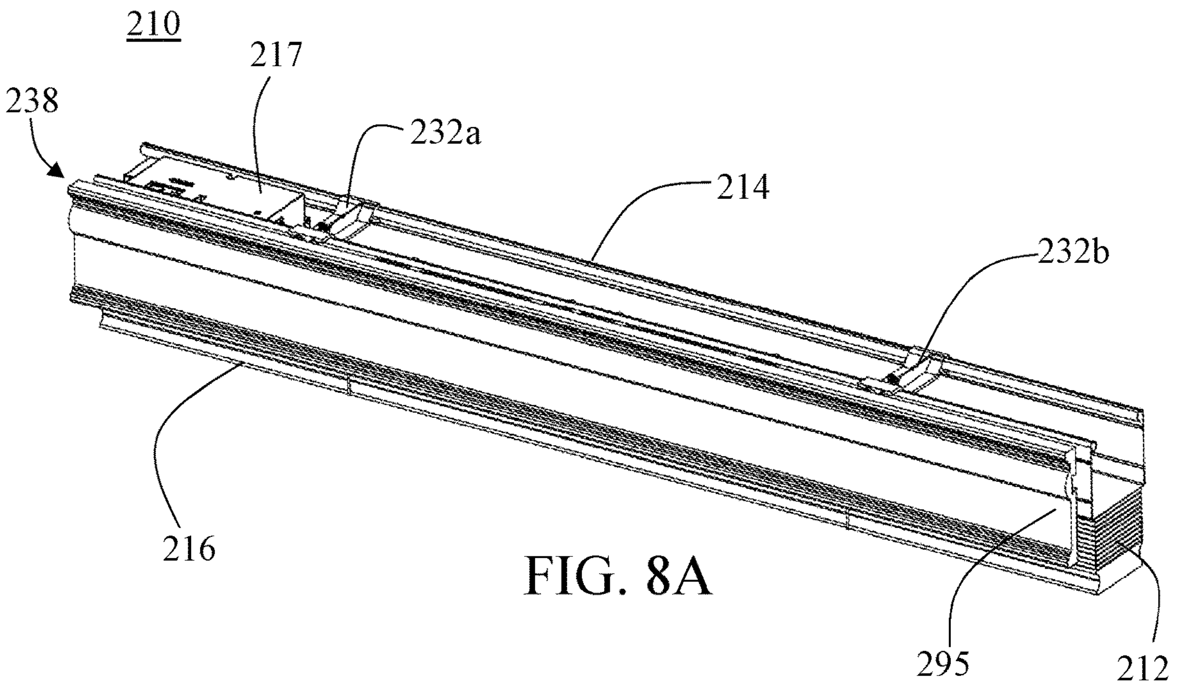
FIG. 8A shows a perspective view of the blind system of FIG. 7 in a raised configuration and with the valance in a first position.
Figure 8B:
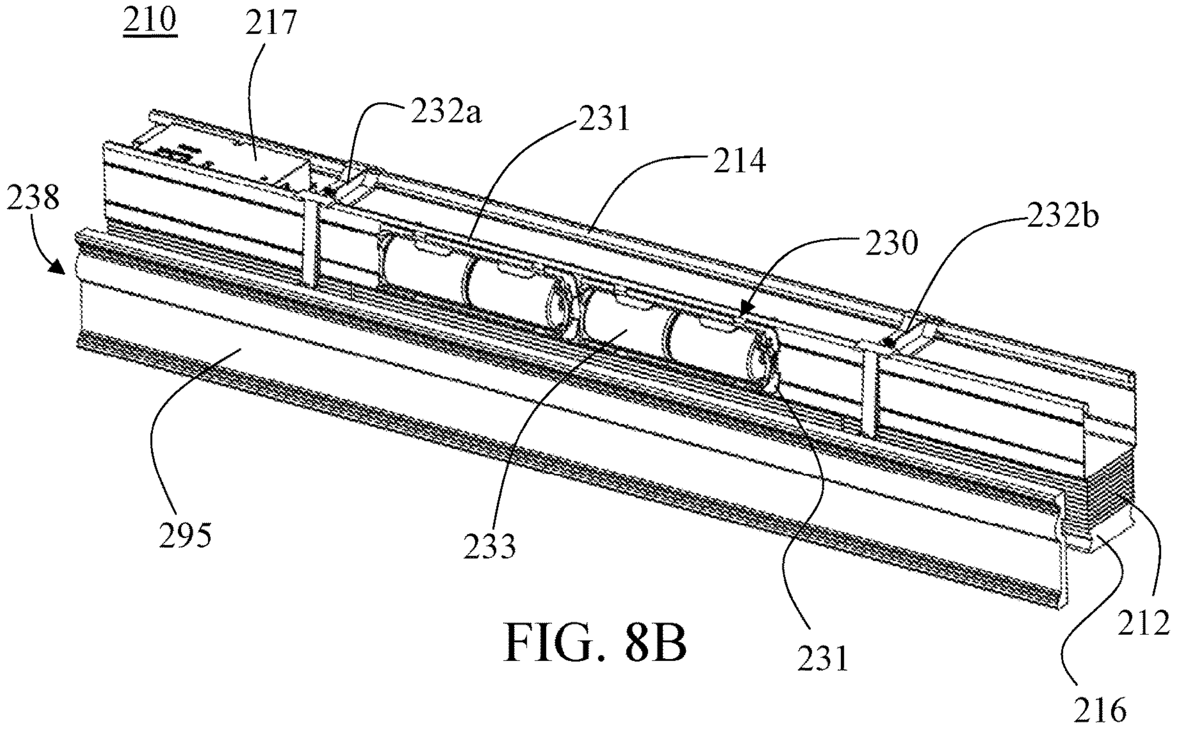
FIG. 8B shows a perspective view of the blind system of FIG. 7 in a raised configuration and with the valance moved to a second position.

The blind system 210 shown in FIGS. 7-8A may include valance clips 232 and a valance 238. The valance clips 232 may each comprise a stationary portion 234 and a movable portion 236. As described above with reference to the blind system 110, the valance may be movable from a first position (e.g., as shown in FIG. 8A) to a second position (e.g., as shown in FIG. 8B).

Figure 9:
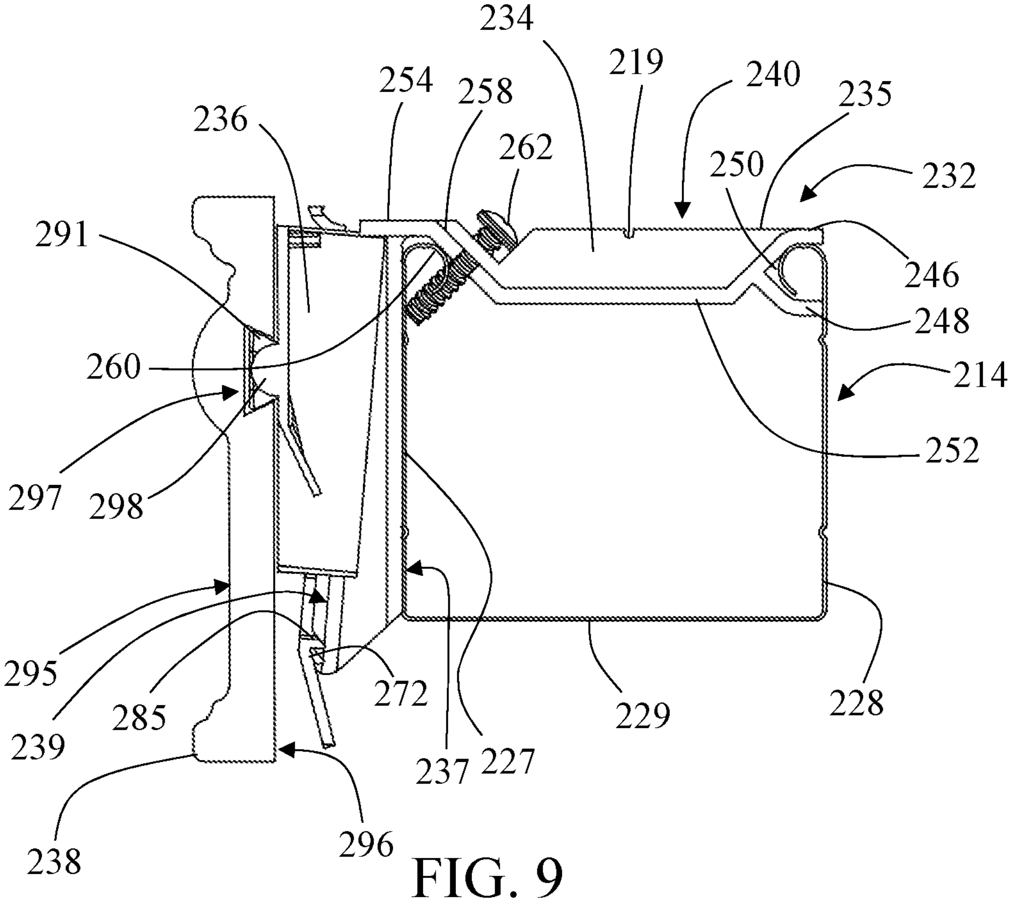
FIG. 9 shows an end view of a headrail, valance, and valance clip of the blind system of FIG. 7, with the valance in the first position.
Figure 10A:
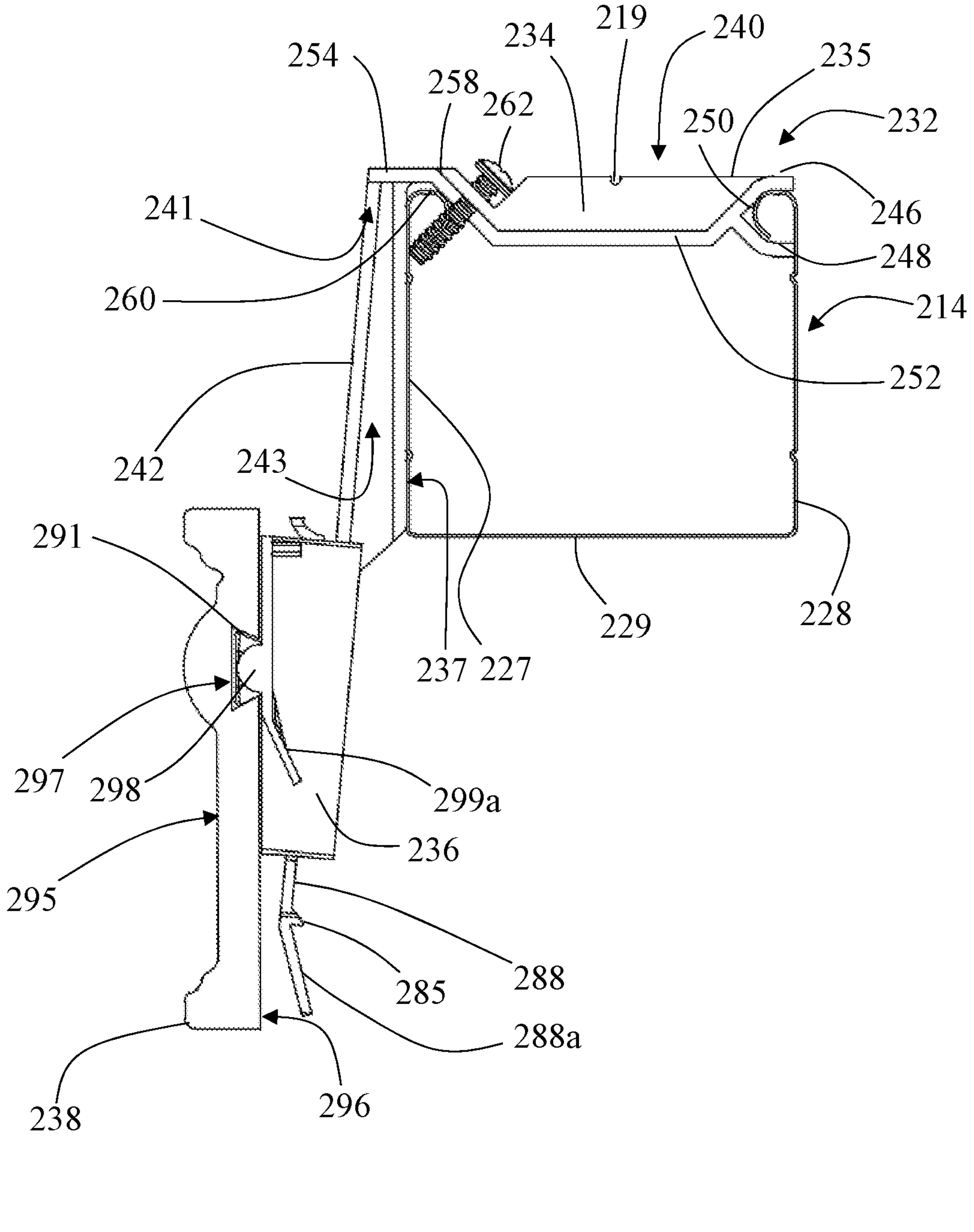
FIG. 10A shows an end view of the headrail, valance, and valance clip of the blind system of FIG. 7, with the valance in the second position.
Figure 10B:
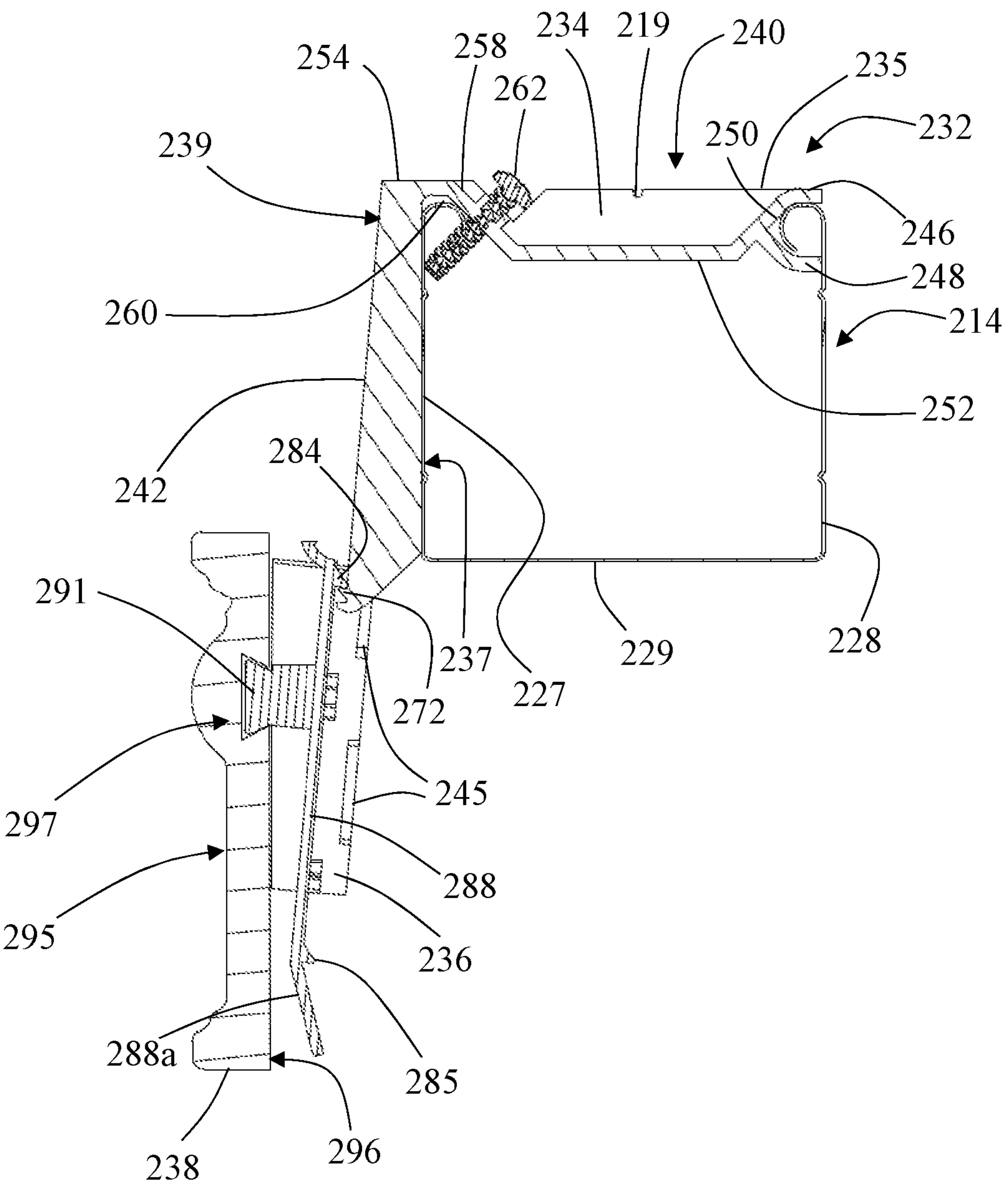
FIG. 10B shows a cross-sectional view of the headrail, valance, and valance clip of the blind system of FIG. 7, with the valance in the second position.

The valance clips 232 and the valance 238 are shown in more detail in FIGS. 9-10B. As shown, for example, in FIG. 9, the first leg 240 of the stationary portion 234 may be substantially similar to the first leg 140 of the stationary portion 134 described above. The stationary portion 234 may additionally include a rib 235 extending between the angled portion 258 and the first prong 246. The rib 235 may stiffen the stationary portion 234 to assist in maintaining the position of the stationary portion 234 with respect to the headrail 214. The stationary portions 234 may also stiffen the headrail 214. This may help prevent deformation of the headrail 214 (e.g., front upright 127 and/or rear upright 128) during shipment and storage. The rib 235 may comprise a notch 219 for holding an antenna (not shown) of the wireless communication circuit of the drive unit 217.

As shown in FIG. 10B, the second leg 242 of the stationary portion 234 may rest against the front upright 227 of the headrail 214. In this embodiment, the second leg 242 may include a single curb 272 extending from the surface of the second leg 242. In the first position, as shown in FIG. 9, the second tooth 285 is in contact with the curb 272. In the second position, as shown best in FIG. 10B, the first tooth 284 may be in contact with the curb 272.

As shown in FIGS. 9 and 10A, the second leg 242 may include a first surface 237 that may be configured to contact the front upright 227 of the headrail 214 and a second surface 239 configured to face toward the valance 238. In some embodiments, the second surface 239 may be oriented at an angle with respect to the front upright 227 such that the valance 238 may move away from the wall as the valance 238 is moved to the second position, as described above. The second leg 242 may further include sides 241 (e.g., as shown in FIG. 10A) extending between the first surface 237 and the second surface 239. The second leg 242 may further include grooves 243 (e.g., as shown in FIG. 10A) in the sides 241. As shown in FIG. 10B, the movable portion 236 may include one or more inwardly-extending protrusions 245 configured to engage the grooves 243. The grooves 243 may be configured to receive the protrusions 245 of the movable portion 236 to maintain engagement of the movable portion 236 with the stationary portion 234.

As shown best in FIG. 10B, the first and second teeth 284, 285 may extend from the rocker 288. The rocker 288 may be configured to pivot about an axis that is substantially parallel to the long axis of the headrail 214. This may allow a user to disengage the first tooth 284 and/or the second tooth 285 from the curb 272. As described above, this may permit the user to remove the movable portion 236 and the valance 238 from the stationary portion 234 to, for example, clean the valance 238. The rocker 288 may include a flared portion 288*a* extending away from the valance 238 such that a user can insert a finger between the valance 238 and the rocker 288 to pivot the rocker 288 to disengage the first tooth 284 from the curb 272.

Figure 11:
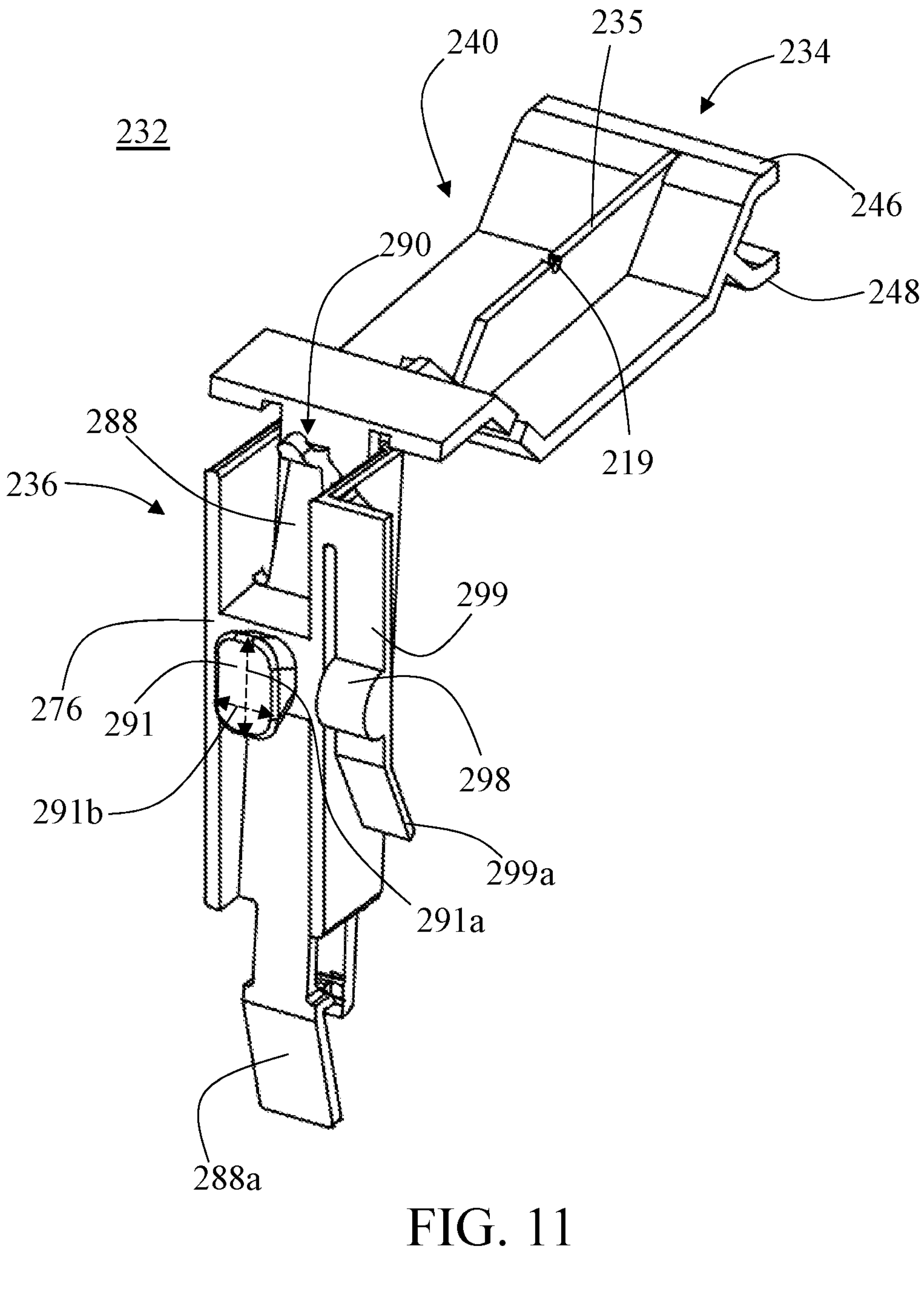
FIG. 11 shows a perspective view of the valance clip of the blind system of FIG. 7, with the valance clip in the first position.
Figure 12:
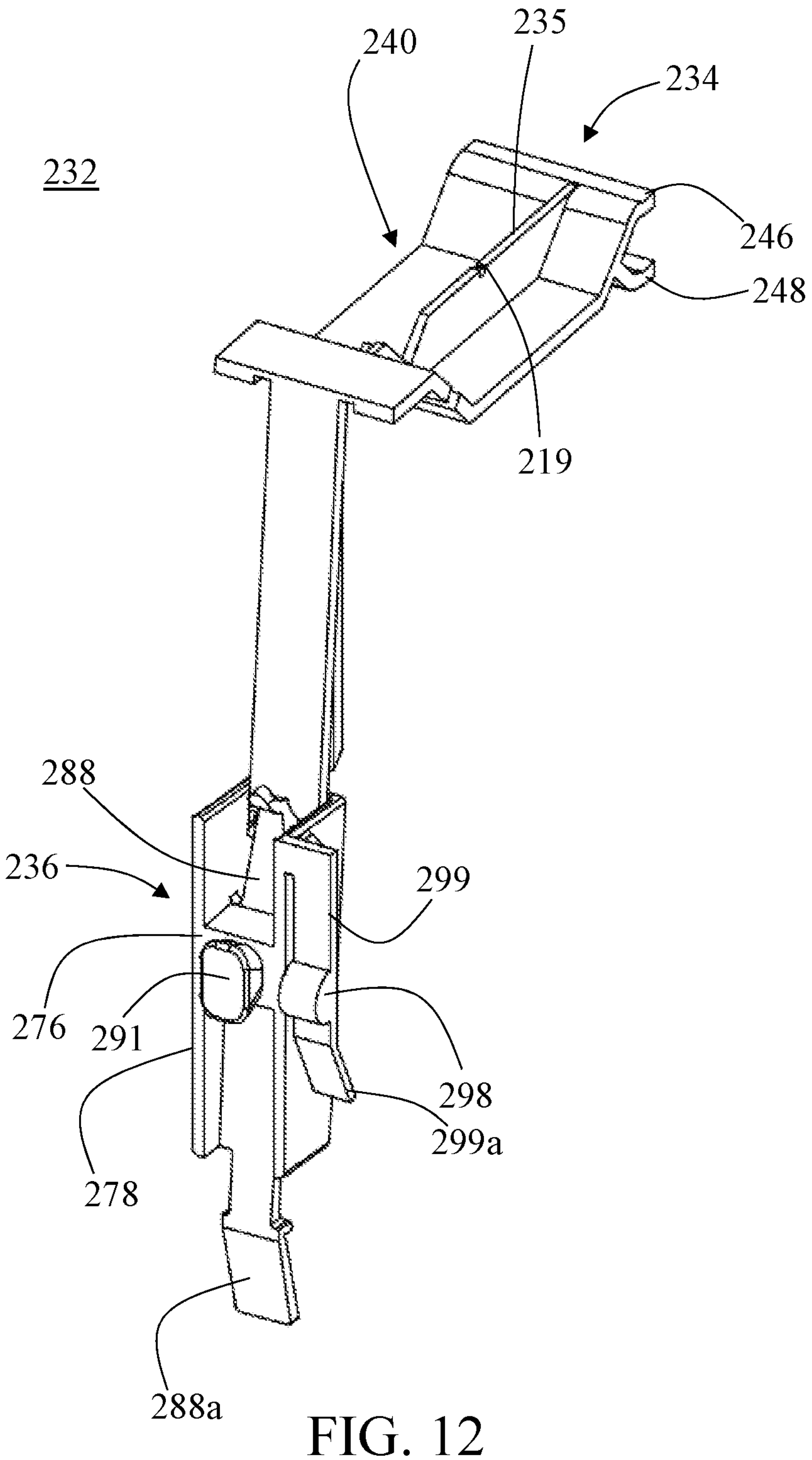
FIG. 12 shows a perspective view of the valance clip of the blind system of FIG. 7, with the valance clip in the second position.

As shown in FIG. 11, the pin 291 of the movable portion 236 may be tapered on all sides. Further, the width 291*a* of the pin 291 may be less than the height 291*b* of the pin 291. As a result, the movable portion 236 may be assembled to the valance 238 by orienting the movable portion 236 horizontally with respect to the valance 238. In such embodiments, the width 291*a* of the pin 291 may be less than the height of the tail 297 in the valance 238. After insertion of the pin 291 in the tail 297, the movable portion 236 may be rotated to the orientation shown, for example, in FIG. 10B such that the movable portion 236 may be secured with the valance 238.

In some embodiments, the movable portion 236 may further include a detent 298 positioned next to the pin 291. The detent 298 may be configured to engage the tail 297 to prevent inadvertent rotation of the movable portion 236 with respect to the valance 238. In some embodiments, the detent 298 may extend from a flex arm 299 such that as the movable portion 236 is inserted in a horizontal orientation the flex arm 299 may flex backward. As the movable portion 236 is rotated, the flex arm 299 may return toward its natural, unstressed position such that the detent 298 may engage the tail 297. In some embodiments, the flex arm 299 may include a finger tab 299*a* extending back away from the valance 238. The user may use the finger tab 299*a* to flex the flex arm 299 and remove the detent 298 from the tail 297 such that the movable portion 236 may be rotated with respect to the valance 238 to remove the movable portion 236 from the valance 238.

Figure 13:
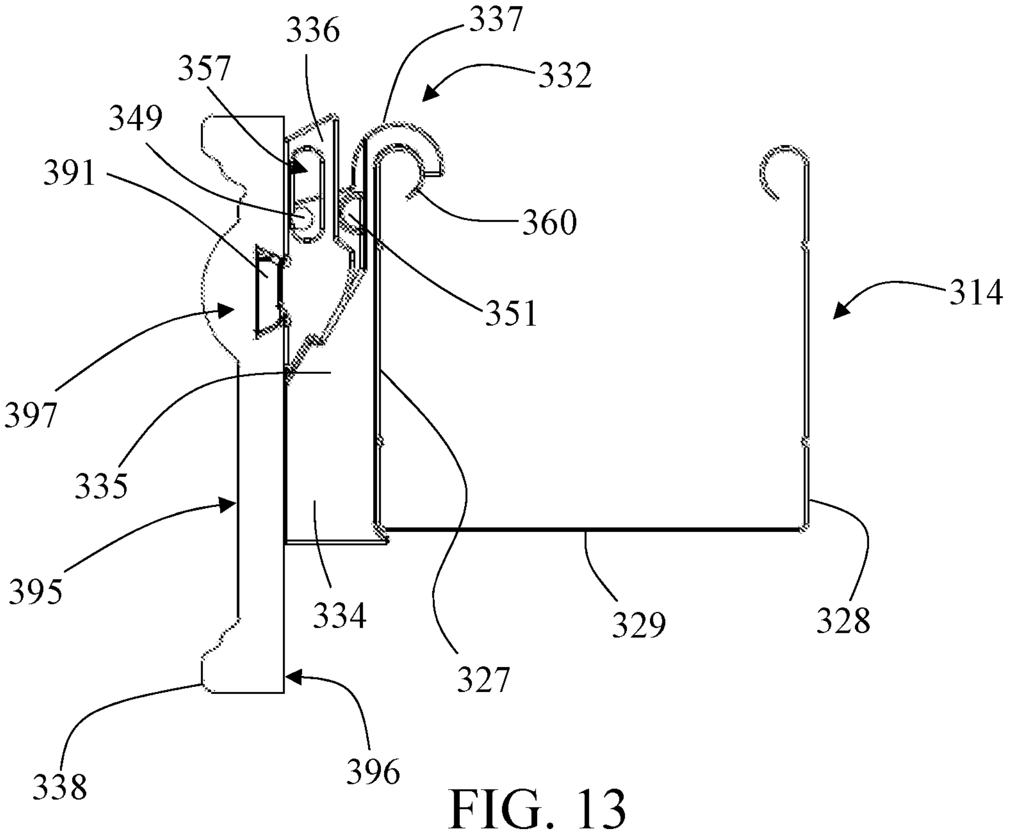
FIG. 13 is an end view of a headrail, valance, and valance clip of a blind system according to another embodiment, with the valance in a first position.
Figure 14:
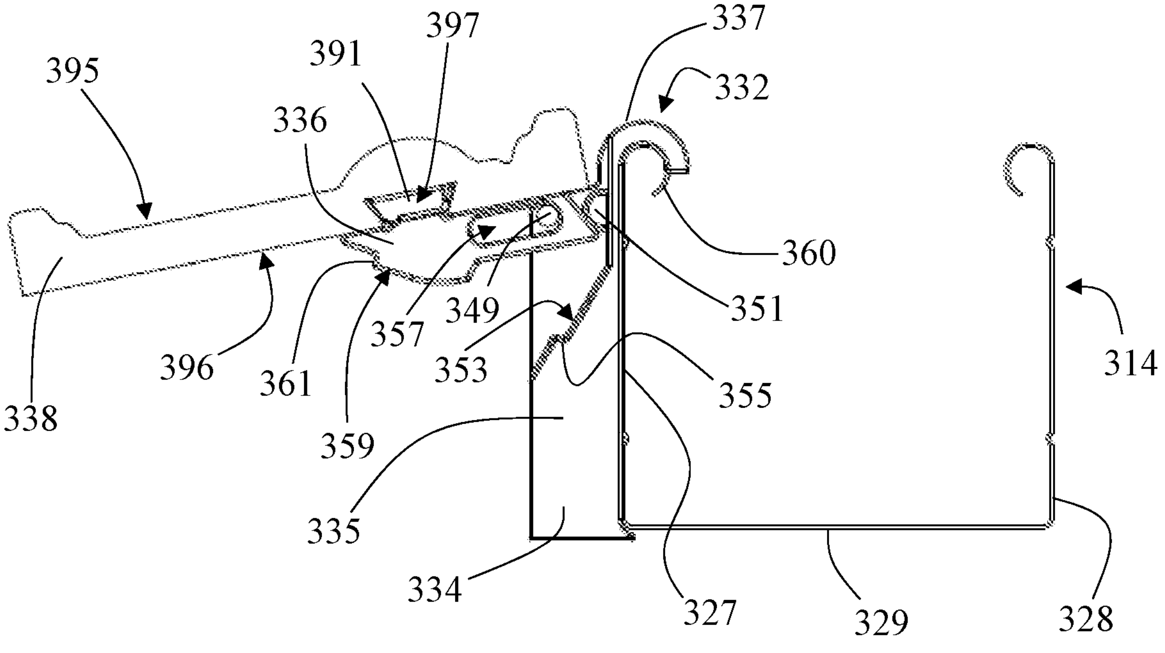
FIG. 14 is an end view of the blind system of FIG. 13, with the valance in a second position.
Figure 15:
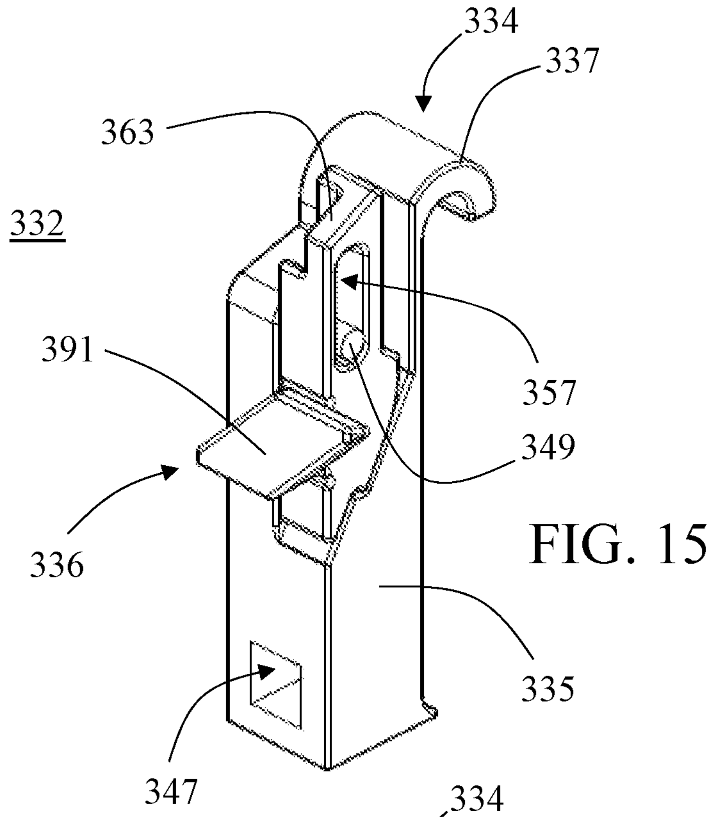
FIG. 15 is a perspective view of the valance clip of the embodiment of FIG. 13, with the valance clip in the first position.
Figure 16:
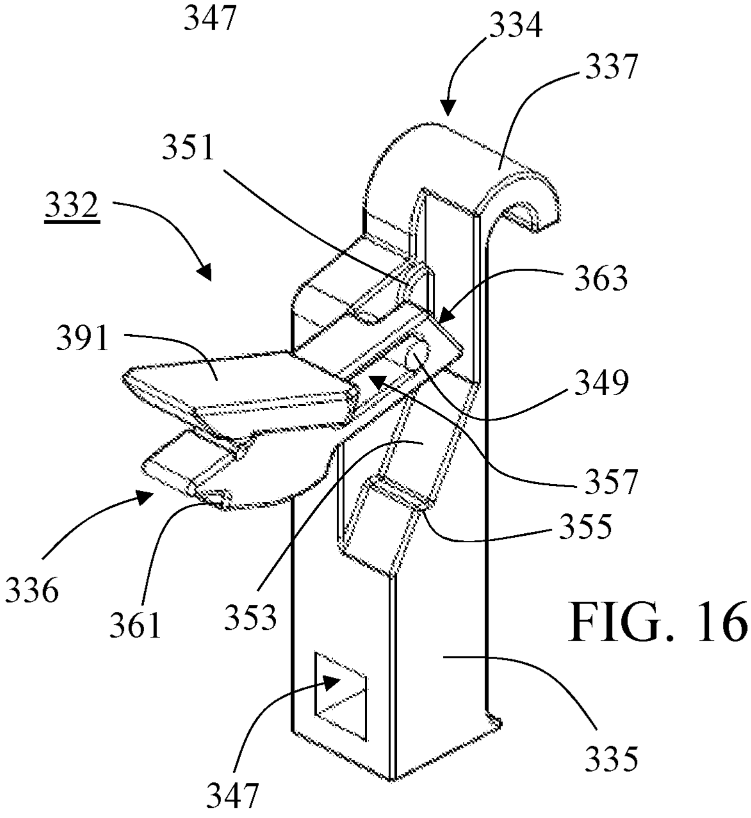
FIG. 16 is a perspective view of the valance clip of the embodiment of FIG. 13, with the valance clip in the second position.

In another embodiment, shown in FIGS. 13-16, the valance and the movable portion of the valance clip may pivot with respect to the stationary portion and the headrail, as described herein. As shown in FIG. 13, a blind system may include a valance clip 332 configured to be coupled to the headrail 114. The valance clip 332 may comprise a stationary portion 334 and a movable portion 336. The stationary portion 334 may include a body 335 and a hook 337. The body 335 may be configured to contact the front upright 327 of the headrail 314 and the hook 337 may be configured to engage the inwardly curved portion 360 of the front upright 327 of the headrail 314. The stationary portion 334 may further include a cavity 347 (e.g., as shown in FIGS. 15 and 16) configured to receive a magnet to further secure the stationary portion 334 to the headrail 314. The stationary portion 334 may further include a pin 349, a detent 351, and an angled face 353. In some embodiments, the angled face 353 may include a ledge 355.

The movable portion 336 may include a slot 357. When the movable portion 336 and valance 338 are in the first position (e.g., as shown in FIG. 13), the slot 357 may be oriented substantially vertically. The slot 357 may be configured to receive the pin 349 of the stationary portion 334 such that the movable portion 336 may be rotatable about the pin 349 from the first position (e.g., as shown in FIG. 13) to the second position (e.g., as shown in FIG. 14). The movable portion 336 may further include an angled face 359 with a ledge 361 configured to engage the ledge 355 of the stationary portion 334. With the movable portion 336 and the valance 338 in the first position, the ledges 355, 361 may be engaged to maintain the relative positions of the movable portion 336 and the stationary portion 334. The movable portion 336 may further include a face 363 vertically above the slot 357. In some embodiments, the face 363 may be disposed at an oblique angle with respect to the longitudinal axis of the slot 357. In the second position (e.g., as shown in FIG. 14), the face 363 may be in contact with the detent 351 of the stationary portion 334 to maintain the movable portion 336 and the valance 338 in the second position. As shown in the transition from FIG. 13 to FIG. 14, the movable portion 336 may allow for the downward movement of the movable portion 336 as the movable portion 336 is moved from the first position to the second position. This may ensure that rotation of the movable portion 336 does not cause the movable portion 336 or the valance 338 to contact the ceiling when the movable portion 336 is moved from the first position to the second position.

Like the movable portion 236 described above, the dovetail pin 391 may have a width less than the height of the tail 397 in the valance 338 such that the dovetail pin 391 may be inserted with the movable portion 336 oriented parallel to the longitudinal axis of the valance 338 and then rotated to lock the movable portion 336 in place with the valance 338.

Figure 17:
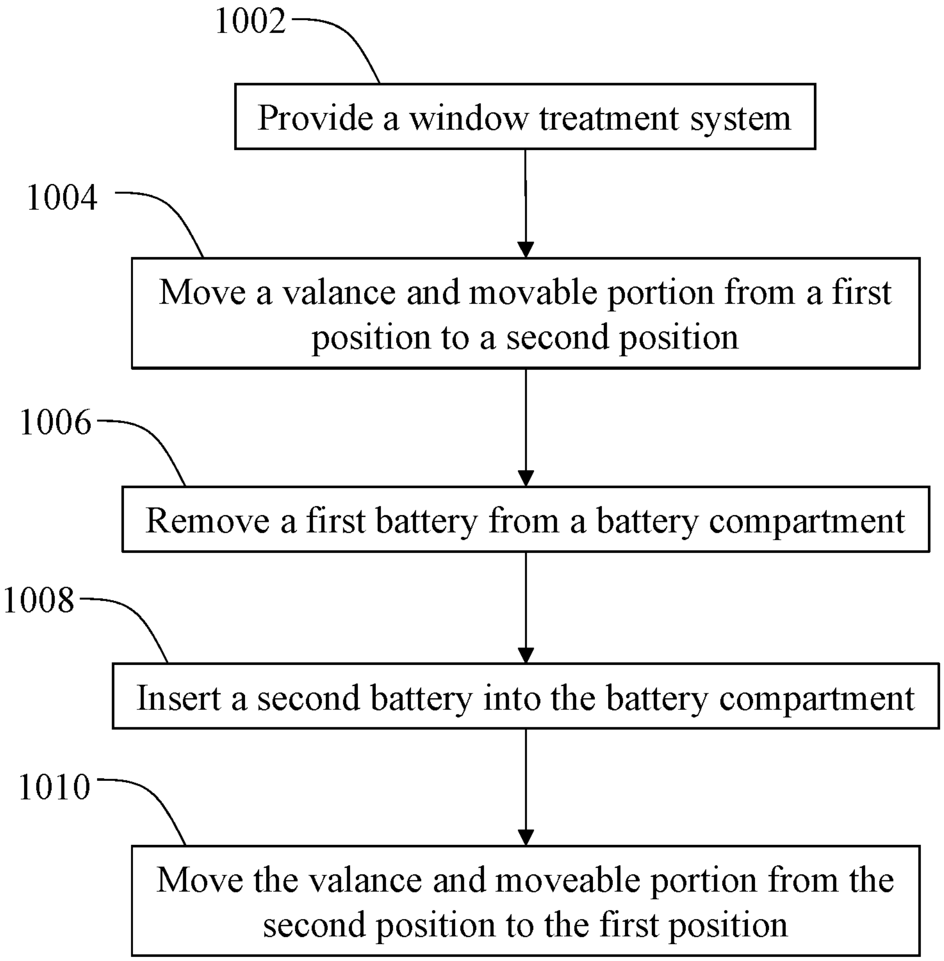
FIG. 17 is a flowchart of a method of replacing batteries in a motorized window treatment system.

In another aspect, illustrated in FIG. 17, a method of installing, removing, or replacing batteries in a window treatment system, such as a blind system, may be provided. The method may include, at step 1002, providing a blind system (e.g., the blind system 110, 210) according to any of the embodiments described herein. The method may further include, at step 1004, moving a valance (e.g., the valance 138, 238, 338) and a movable portion (e.g., the movable portion 136, 236, 336) from a first position (e.g., as shown in FIGS. 3, 9, and 13) to a second position (e.g., as shown in FIGS. 4A, 10A, and 14). The method may further include, at step 1006, removing a first battery (e.g., one or more of the batteries 133, 233) from the battery compartment (e.g., the battery compartment 131, 231). The method may further include, at step 1008, inserting a second battery into the battery compartment. The method may further include, at step 1010, moving the valance and the movable portion from the second position to the first position.

Figure 18:
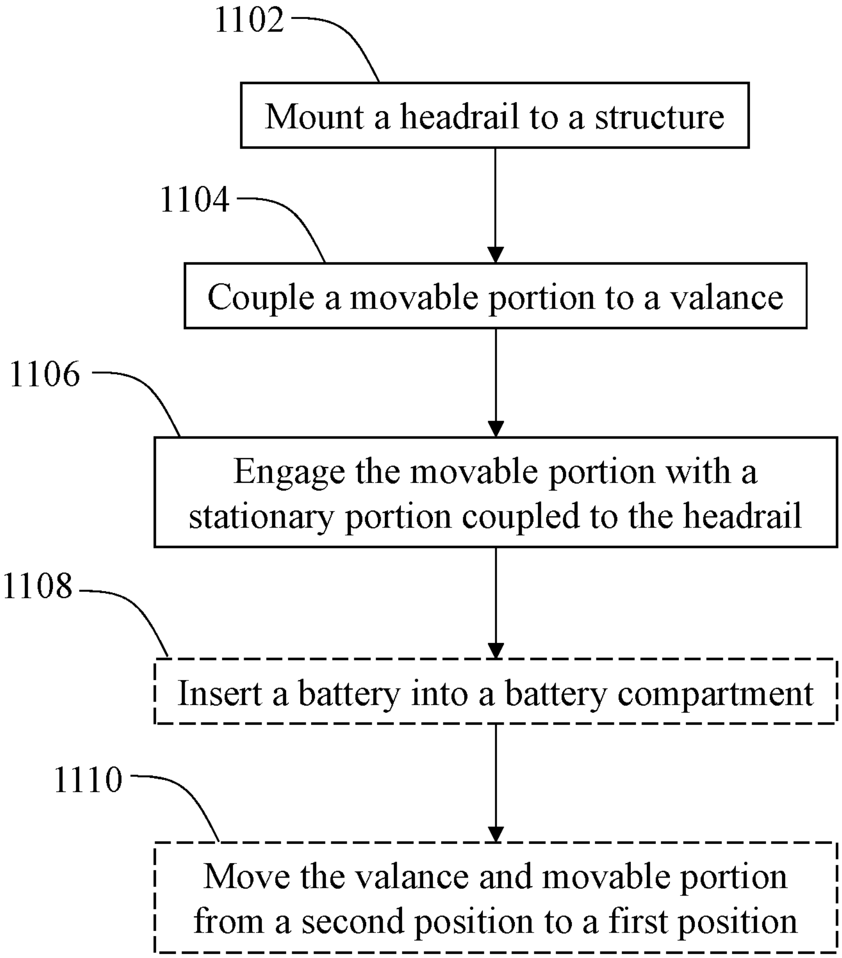
FIG. 18 is a flowchart of a method of installing a motorized window treatment system.

In another aspect, as shown in FIG. 18, a method of installing a window treatment system, such as a blind system, may be provided. The method may include, at step 1102, mounting a headrail (e.g., the headrail 114, 214) of a blind system (e.g., the blind system 110, 210) according to any of the embodiments described herein to structure (e.g., such as a window frame and/or a wall). The method may further include, at step 1104, coupling a movable portion (e.g., the movable portion 136, 236) to a valance (e.g., the valance 138, 238). The method may further include, at step 1106, engaging the movable portion with a stationary portion (e.g., the stationary portion 134, 234) coupled to the headrail. In some embodiments, the method may include coupling the movable portion and valance via a dovetail joint. In some embodiments, the method may further include coupling the stationary portion to the headrail. Further, in some embodiments, the method may further include, at step 1108, inserting a battery (e.g., one or more of the batteries 133, 233) into a battery compartment (e.g., the battery compartment 131, 231) of the blind system. In such embodiments, the method may further include, at step 1110, moving the valance and movable portion from a position in which the battery and battery compartment are at least partially exposed (e.g., as shown in FIGS. 4A, 10A, and 14) to a position in which the valance covers the battery compartment and the battery (e.g., as shown in FIGS. 3, 9, and 13).

While the foregoing description and drawings represent preferred or exemplary embodiments of the present disclosure, it will be understood that various additions, modifications and substitutions may be made therein without departing from the spirit and scope and range of equivalents of the accompanying claims. In particular, it will be clear to those skilled in the art that the embodiments disclosed herein may be embodied in other forms, structures, arrangements, proportions, sizes, and with other elements, materials, and components, without departing from the spirit or essential characteristics thereof. One skilled in the art will further appreciate that the window treatment systems described herein may be used with many modifications of structure, arrangement, proportions, sizes, materials, and components and otherwise, used in the practice of the window treatment systems, which are particularly adapted to specific environments and operative requirements without departing from the principles disclosed herein. The presently disclosed embodiments are therefore to be considered in all respects as illustrative and not restrictive, the scope being defined by the appended claims and equivalents thereof, and not limited to the foregoing description or embodiments. Rather, the appended claims should be construed broadly, to include other variants and embodiments, which may be made by those skilled in the art without departing from the scope and range of equivalents. All patents and published patent applications identified herein are incorporated herein by reference in their entireties.

We claim:

1. A motorized window treatment system comprising:

a headrail;

a covering material extending from the headrail;

a battery compartment coupled to the headrail;

a valance clip comprising:

a stationary portion coupled to the headrail, the stationary portion including a first engagement feature and a second engagement feature that is separated from the first engagement feature by a surface, and a movable portion configured to be coupled to the stationary portion such that the movable portion is movable along the surface of the stationary portion between a first retained position at which the movable portion engages the first engagement feature and a second retained position at which the movable portion engages the second engagement feature; and a valance configured to be coupled to the movable portion of the valance clip;

wherein, when the movable portion is in the first retained position, the valance covers the battery compartment, wherein, when the movable portion is in the second retained position, the battery compartment is at least partially exposed such that a battery may be inserted into or removed from the battery compartment, and wherein the stationary portion is disposed at an angle such that linear movement of the movable portion results in the valance moving away from the headrail in at least two directions.

2. The motorized window treatment system of claim 1, further comprising:

a drive unit located in the headrail for adjusting the covering material to control an amount of daylight entering a space;

wherein the battery compartment is configured to hold at least one battery for powering the drive unit.

3. The motorized window treatment system of claim 2, further comprising:

a bottom bar;

wherein the covering material comprises a plurality of rectangular slats spaced apart vertically between the headrail and the bottom bar.

4. The motorized window treatment system of claim 3, further comprising:

a tilt ladder extending from the headrail to the bottom bar and operable to support the slats and to tilt the slats;

wherein the drive unit is operably coupled to the tilt ladder for tilting the slats.

5. The motorized window treatment system of claim 3, further comprising:

a lift cord extending from the headrail to the bottom bar to provide for raising and lowering the bottom bar;

wherein the drive unit is operably coupled to the lift cord for winding and unwinding the lift cord to respectively raise and lower the bottom bar.

6. The motorized window treatment system of claim 2, wherein the covering material comprises a cellular shade fabric.

7. The motorized window treatment system of claim 1, wherein the stationary portion comprises a first leg configured to be coupled to the headrail and a second leg configured to be coupled to the movable portion.

8. The motorized window treatment system of claim 7, wherein the headrail includes a front upright, a rear upright, and a base extending between the front upright and the rear upright, and wherein a face of the second leg of the stationary portion defines an oblique angle with respect to the front upright.

9. The motorized window treatment system of claim 8, wherein the front upright includes an aperture and the battery compartment is coupled to the front upright such that, when a battery is installed in the battery compartment, the battery extends through the aperture with a portion of the battery on each side of the front upright.

10. The motorized window treatment system of claim 8, wherein the oblique angle is between about 5 degrees and about 15 degrees.

11. The motorized window treatment system of claim 7, wherein the second leg of the stationary portion includes a first notch corresponding to the first engagement feature and a second notch corresponding to the second engagement feature, and wherein the movable portion includes a rocker having a tooth, and wherein the tooth of the rocker is configured to engage the first notch when the movable portion is in the first retained position, and wherein the tooth is configured to engage the second notch when the movable portion is in the second retained position.

12. The motorized window treatment system of claim 11, wherein the movable portion includes a second tooth, and wherein, when the movable portion is retained in the first retained position, the second tooth is engaged with the second notch.

13. The motorized window treatment system of claim 11, wherein the rocker includes a contoured end configured to receive a finger of a user to apply a force on the rocker to disengage the tooth from the first notch or the second notch.

14. The motorized window treatment system of claim 1, wherein the movable portion and the valance are configured to engage one another via a dovetail joint.

15. The motorized window treatment system of claim 14, wherein the movable portion includes a male pin, and the valance includes a female tail configured to receive the male pin.

16. The motorized window treatment system of claim 1, further comprising:

a fastener coupling the stationary portion to the headrail.

17. The motorized window treatment system of claim 1, wherein the valance clip comprises a first valance clip, the blind system further comprising a second valance clip configured to be coupled to the headrail at a second location spaced apart from the first valance clip.

18. The motorized window treatment system of claim 1, wherein the at least two directions includes a vertical direction and a horizontal direction.

* * * * *